(12) United States Patent
Kurabayashi

(10) Patent No.: US 10,841,434 B2
(45) Date of Patent: Nov. 17, 2020

(54) IMAGE FORMING SYSTEM, RECORDING MEDIUM, AND PRINTED MATTER PROVIDING A VISUAL REPRESENTATION OF THE DENSITY OF AN IMAGE

(71) Applicant: Dai Kurabayashi, Kanagawa (JP)

(72) Inventor: Dai Kurabayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/460,373

(22) Filed: Jul. 2, 2019

(65) Prior Publication Data

US 2020/0021693 A1 Jan. 16, 2020

(30) Foreign Application Priority Data

Jul. 13, 2018 (JP) ................. 2018-132874
Jun. 27, 2019 (JP) ................. 2019-120314

(51) Int. Cl.
*H04N 1/00* (2006.01)
*G06K 15/02* (2006.01)
*H04N 1/23* (2006.01)
*H04N 1/407* (2006.01)
*H04N 1/60* (2006.01)

(52) U.S. Cl.
CPC ....... *H04N 1/00015* (2013.01); *G06K 15/027* (2013.01); *H04N 1/00034* (2013.01); *H04N 1/00045* (2013.01); *H04N 1/00068* (2013.01); *H04N 1/00074* (2013.01); *H04N 1/00082* (2013.01); *H04N 1/00411* (2013.01); *H04N 1/2315* (2013.01); *H04N 1/2392* (2013.01);
(Continued)

(58) Field of Classification Search
CPC .......... H04N 1/00015; H04N 1/00029; H04N 1/00031; H04N 1/00034; H04N 1/00037; H04N 1/00042; H04N 1/00045; H04N 1/00074; H04N 1/00076; H04N 1/00082; H04N 1/00087; H04N 1/034; H04N 1/00408; H04N 1/0044; H04N 1/00485; H04N 1/0049; H04N 1/00506; H04N 1/6041; G06K 15/027; G06K 15/102
See application file for complete search history.

(56) References Cited

U.S. PATENT DOCUMENTS

| | | | |
|---|---|---|---|
| 9,762,752 B2* | 9/2017 | Ikeda | H04N 1/00023 |
| 2012/0081768 A1* | 4/2012 | Iguchi | H04N 1/4015 358/518 |
| 2018/0227460 A1* | 8/2018 | Casaldaliga | H04N 1/4078 |

FOREIGN PATENT DOCUMENTS

JP 2018-008483 1/2018

* cited by examiner

*Primary Examiner* — Scott A Rogers
(74) *Attorney, Agent, or Firm* — Harness, Dickey & Pierce, P.L.C.

(57) ABSTRACT

An image forming system includes an image forming device configured to form an image on a recording medium, a reading device configured to read the image formed on the recording medium by the image forming device, and circuitry. The circuitry is configured to control the reading device; calculate a density of each predetermined unit area of the read image; determine whether the read image includes a region satisfying a predetermined density condition based on the calculated density; and output an image of a first region of the read image not satisfying the predetermined density condition, an image of a second region satisfying the predetermined density condition, and a visual representation associated with the second region in response to a determination that the read image includes the second region.

12 Claims, 26 Drawing Sheets

(52) U.S. Cl.
CPC ........... *H04N 1/407* (2013.01); *H04N 1/6027* (2013.01); *H04N 1/6041* (2013.01)

FIG. 2
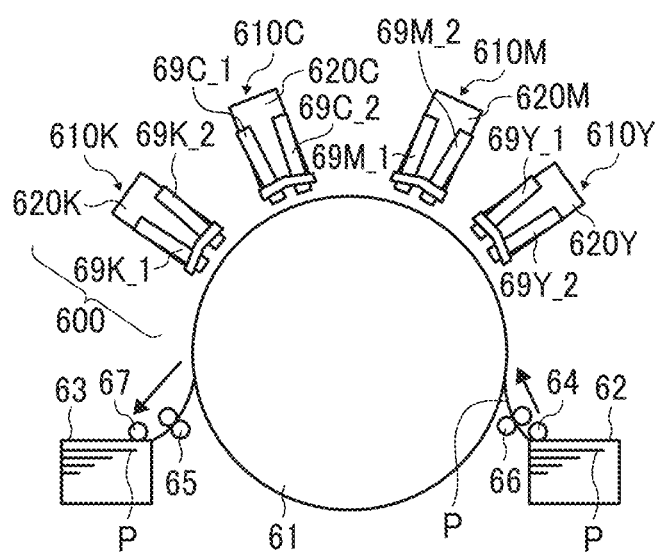
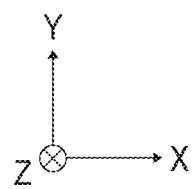

FIG. 4A
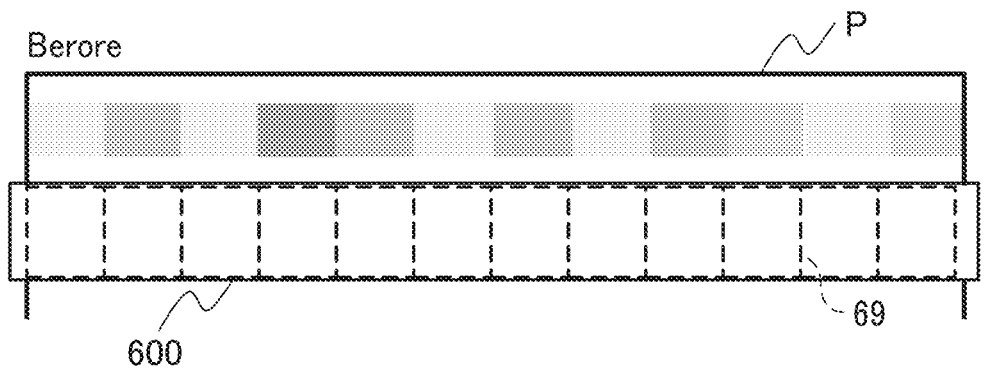
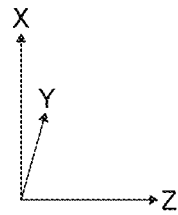
FIG. 4B
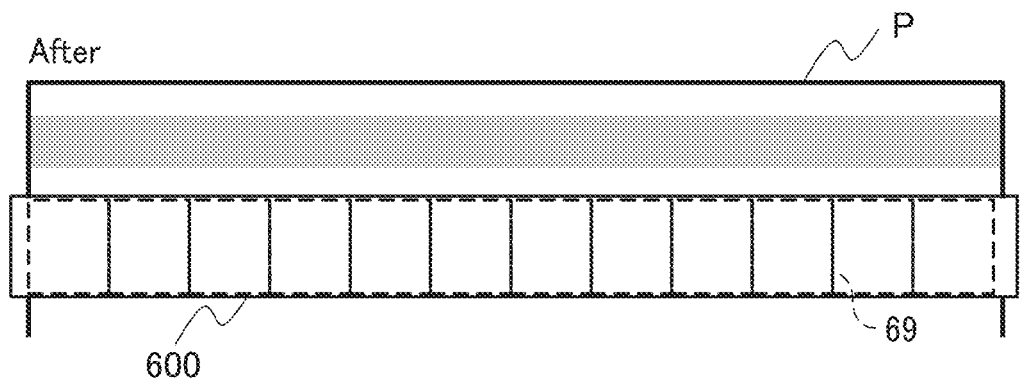
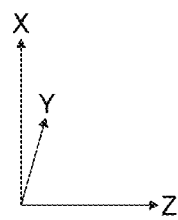

FIG. 13A
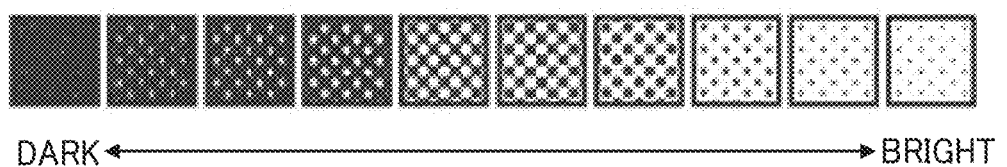
DARK ← → BRIGHT
FIG. 13B
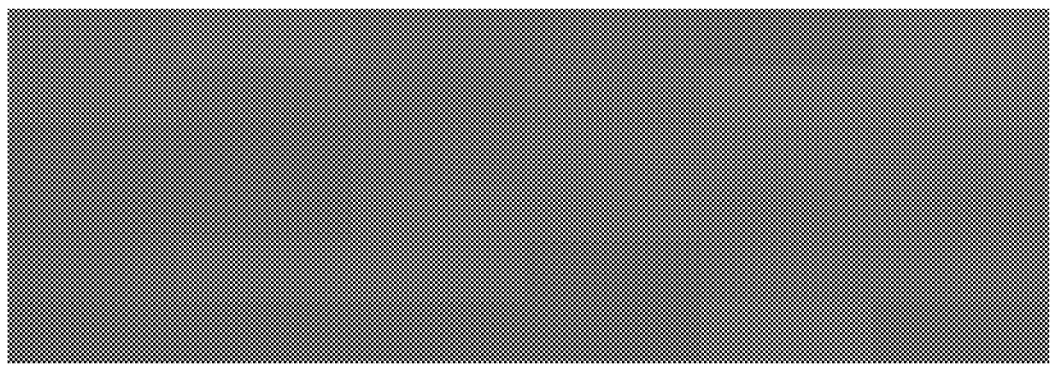
FIG. 13C
| 43 | 37 | 25 | 31 | 39 | 56 |
| --- | --- | --- | --- | --- | --- |
| 29 | 21 | 32 | 40 | 48 | 33 |
| 23 | 37 | 42 | 40 | 28 | 28 |
| 36 | 43 | 34 | 21 | 34 | 42 |
| 36 | 25 | 30 | 27 | 45 | 45 |
| 22 | 20 | 37 | 45 | 37 | 22 |

FIG. 16A

| (X0,Y0) | (X1,Y0) | (X2,Y0) | (X3,Y0) | (X4,Y0) | (X5,Y0) |
|---|---|---|---|---|---|
| (X0,Y1) | (X1,Y1) | (X2,Y1) | (X3,Y1) | (X4,Y1) | (X5,Y1) |
| (X0,Y2) | (X1,Y2) | (X2,Y2) | (X3,Y2) | (X4,Y2) | (X5,Y2) |
| (X0,Y3) | (X1,Y3) | (X2,Y3) | (X3,Y3) | (X4,Y3) | (X5,Y3) |
| (X0,Y4) | (X1,Y4) | (X2,Y4) | (X3,Y4) | (X4,Y4) | (X5,Y4) |
| (X0,Y5) | (X1,Y5) | (X2,Y5) | (X3,Y5) | (X4,Y5) | (X5,Y5) |

FIG. 16B

| 5 | 5 | 5 | 5 | 5 | 5 |
|---|---|---|---|---|---|
| 5 | 5 | 5 | 5 | 5 | 5 |
| 5 | 5 | 5 | 5 | 5 | 10 |
| 5 | 5 | 5 | 5 | 5 | 5 |
| 5 | 5 | 5 | 5 | 5 | 10 |
| 5 | 5 | 5 | 5 | 5 | 5 |

FIG. 16C

| COLUMN A | COLUMN B | COLUMN C |
|---|---|---|
| 20 | 20 | 20 |
|  |  |  |
| 20 | 20 | 25 |
|  |  |  |
| 20 | 20 | 25 |
|  |  |  |

FIG. 16D

| COLUMN A | COLUMN B | COLUMN C |
|---|---|---|
| 5 | 5 | 5 |
|  |  |  |
| 5 | 5 | 6.25 |
|  |  |  |
| 5 | 5 | 6.25 |
|  |  |  |

FIG. 25

| COLUMN A | | COLUMN B | | COLUMN C | |
|---|---|---|---|---|---|
| 0.06 | | 0.06 | | 0.06 | |
| | | | | | |
| 0.06 | | 0.06 | | 0.71 | |
| | | | | | |
| 0.06 | | 0.06 | | 0.71 | |
| | | | | | |

<NORMAL IMAGE>

PIXEL COLUMN

<SUBSTANDARD IMAGE>

PIXEL COLUMN

IMAGE FORMING SYSTEM, RECORDING MEDIUM, AND PRINTED MATTER PROVIDING A VISUAL REPRESENTATION OF THE DENSITY OF AN IMAGE

CROSS-REFERENCE TO RELATED APPLICATIONS

This patent application is based on and claims priority pursuant to 35 U.S.C. § 119(a) to Japanese Patent Application Nos. 2018-132874, filed on Jul. 13, 2018, and 2019-120314, filed on Jun. 27, 2019, in the Japan Patent Office, the entire disclosure of each of which is hereby incorporated by reference herein.

BACKGROUND

Technical Field

The present disclosure relates to an image forming system, a recording medium storing program codes for a density adjusting method, and a printed matter.

Description of the Related Art

Regarding liquid discharge heads for inkjet image forming apparatuses, dimensional error (tolerance) in manufacturing or the like can cause variations in discharge speed and amount of liquid discharged among a plurality of liquid discharge heads. Such variations increase the possibility of uneven density in an image formed on a recording medium (a recording target).

Therefore, there is a technique for detecting the uneven density of the liquid discharged onto the recording medium from the liquid discharge heads and correcting an output value from the liquid discharge heads based on the result of detection, to make the density of the image uniform.

SUMMARY

According to an embodiment of this disclosure, an image forming system includes an image forming device configured to form an image on a recording medium, a reading device configured to read the image formed on the recording medium by the image forming device, and circuitry. The circuitry is configured to control the reading device; calculate a density of each predetermined unit area of the read image; determine whether the read image includes a region satisfying a predetermined density condition based on the calculated density; and output an image of a first region of the read image not satisfying the predetermined density condition, an image of a second region satisfying the predetermined density condition, and a visual representation associated with the second region in response to a determination that the read image includes the second region.

Another embodiment provides a non-transitory recording medium storing a plurality of program codes which, when executed by one or more processors, causes the processors to perform a density adjusting method. The method includes reading, with a reading device, an image formed by an image forming apparatus; calculating a density of each predetermined unit area of the read image; determining whether the read image includes a region satisfying a predetermined density condition based on the calculated density; and outputting an image of a first region not satisfying the predetermined density condition, an image of a second region satisfying the predetermined density condition, and a visual representation associated with the second region in response to a determination that the read image includes the second region.

Another embodiment provides a printed matter that includes an image formed by an image forming apparatus and a visual representation associated with an uneven density region of the image. The visual representation is discrimination of the uneven density region from another region of the image.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2 is a schematic front view illustrating an example of a configuration of a printer according to Embodiment 1;

FIGS. 4A and 4B are schematic diagrams illustrating uneven density of a printed image;

FIGS. 13A, 13B, and 13C are diagrams for explaining an example of calculation processing in the printing control apparatus according to Embodiment 1;

FIGS. 16A to 16D are diagrams for explaining an example of analysis process of a corrected density chart in the printing control apparatus according to Embodiment 1;

FIG. 25 is a diagram for explaining an example of analysis process of the corrected density chart in the printing control apparatus according to a modification of Embodiment 1;

Figure 1:
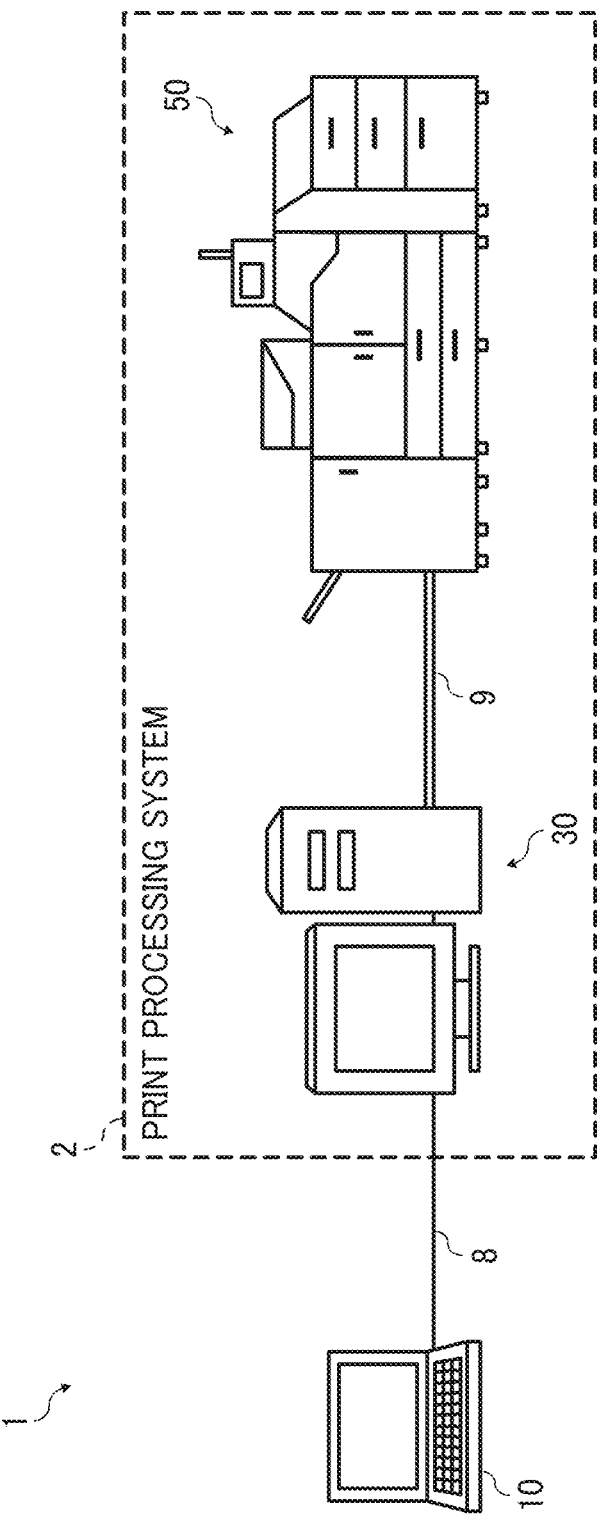
FIG. 1 is a block diagram illustrating a configuration of a printing system according to Embodiment 1.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, embodiments of this disclosure are described. As used herein, the singular forms "a", "an", and "the" are intended to include the plural forms as well, unless the context clearly indicates otherwise.

The suffixes Y, M, C, and K attached to each reference numeral indicate only that components indicated thereby are used for forming yellow, magenta, cyan, and black images, respectively, and hereinafter may be omitted when color discrimination is not necessary.

Embodiment 1

System Configuration

FIG. 1 is a block diagram illustrating a configuration of a printing system according to Embodiment 1. A printing system 1 according to the present embodiment can improve the efficiency of inspection, by a user, of the density of an image formed on a recording medium.

As illustrated in FIG. 1, the printing system 1 includes a communication terminal 10 and a print processing system 2. The printing system 1 is an example of a network image forming system. The print processing system 2 includes a printing control apparatus 30 such as digital front end (DFE) server and a printer 50. The print processing system 2 is an example of an image forming system.

The communication terminal 10 and the printing control apparatus 30 are communicable with each other via a first network such as a local area network (LAN) 8. The printing control apparatus 30 and the printer 50 are communicable with each other via a second communication network such as a dedicated line 9. In the following description, production printing (image formation) by the printing system 1 will be described as an example, but embodiments of the present disclosure can be applied to other types of printing systems.

The communication terminal 10 is, for example, a personal computer (PC) for viewing and editing print data that is an example of image formation target data. The communication terminal 10 is not limited to a PC but can be, for example, a mobile phone, a smartphone, a tablet terminal, a digital camera, or the like. The printing control apparatus 30 is a server computer. Specifically, the printing control apparatus 30 generates bitmap data for printing, based on print data sent from the communication terminal 10, and sends the generated bitmap data and a print instruction to the printer 50. The printing control apparatus 30 is an example of an image formation control apparatus. The printer 50 prints an image on a recording sheet based on the bitmap data transmitted from the printing control apparatus 30. The printer 50 is an example of an image forming apparatus.

Although FIG. 1 illustrates the printing system 1 including one communication terminal 10, one printing control apparatus 30, and one printer 50, but embodiments of the present disclosure are not limited thereto. For example, in the printing system 1, the number of at least one of the communication terminal 10, the printing control apparatus 30, and the printer 50 can be a plural number. In the example described below, the print processing system 2 includes the printing control apparatus 30 and the printer 50. However, a function of the printing control apparatus 30 can be fulfilled by the printer 50 so that the print processing system 2 is constituted by the printer 50 only.

Next, a configuration of the printer 50 will be described with reference to FIGS. 2 to 4. FIG. 2 is a schematic front view illustrating an example of the configuration of the printer according to Embodiment 1. The printer 50 illustrated in FIG. 2 is a liquid discharge apparatus that includes liquid discharge heads 69 (69Y_1, 69Y_2, 69M_1, 69M_2, 69C_1, 69C_2, 69K_1, and 69K_2 in FIG. 2) to discharge liquid and apply the liquid onto a recording medium. For example, the printer 50 discharges ink as a liquid from the liquid discharge heads 69 to form an image on a recording medium such as a sheet P (e.g., a paper sheet).

As illustrated in FIG. 2, the printer 50 includes a conveyor drum 61, a sheet feeding tray 62, an output tray 63, and a head array 600. The conveyor drum 61 holds and conveys the sheet P on the circumferential surface thereof at the time of liquid discharge. The sheet feeding tray 62 accommodates the sheets P and supplies the sheets P to the conveyor drum 61. On the circumferential surface of the conveyor drum 61, the liquid is applied to the sheet P while the sheet P is conveyed. Then, the sheet P is received on the output tray 63 and stacked one by one therein. The head array 600 discharges the liquid onto the sheet P held on the circumferential surface of the conveyor drum 61.

The conveyor drum 61 attracts the sheet P sent, for example, from the sheet feeding tray 62 to the drum side. The circumferential surface of the conveyor drum 61 is provided with a plurality of small through-holes penetrating into a negative pressure space inside the conveyor drum 61. The conveyor drum 61 is provided with a negative pressure generating pump to maintain a negative pressure in the negative pressure space. Accordingly, the sheet P is attracted to the circumferential surface of the conveyor drum 61 in tight contact.

The sheets P stacked in the sheet feeding tray 62 are separated by a separation roller 64 and a sheet feeding roller 66 and conveyed one by one to a conveying portion of the conveyor drum 61. The conveying portion is the surface of an upper half of the conveyor drum 61 and a range between a sheet feeding position and a sheet ejection position. As the sheet P to which the liquid is applied is conveyed to the sheet ejection position on the circumferential surface of the conveyor drum 61, an output roller pair 65 and a forwarding roller 67 separate the sheet P from the conveyor drum 61 and stack the sheet P on the output tray 63.

As illustrated in FIG. 2, the head array 600 includes four head units 610K, 610C, 610M, and 610Y disposed radially around the conveying portion of the conveyor drum 61, that is, the upper half of the conveyor drum 61. The head units 610K, 610C, 610M, and 610Y are also collectively referred to as "head units 610" when discrimination is not necessary.

As illustrated in FIG. 2, each head unit 610 includes a base frame 620K, 620C, 620M, or 620Y (also collectively "base frame 620") and a plurality of liquid discharge heads 69 held by the base frame 620. The longitudinal direction (in the Z axis direction) of each base frame 620 coincides with the axial direction of the conveyor drum 61, and both ends of the base frame 620 in the longitudinal direction correspond to ends of the conveyor drum 61 in the longitudinal direction. The base frame 620 further includes a discharge mechanism that contributes to liquid discharge from the liquid discharge heads 69. The discharge mechanism includes, for example, at least one of a head tank to contain the liquid to be discharged from the liquid discharge heads 69, a piezoelectric actuator (e.g., a laminated piezoelectric element or a thin-film piezoelectric element), a thermal actuator using an electrothermal transducer element such as a heat element, an electrostatic actuator including a diaphragm and a counter electrode, a carriage, a supply mechanism, a maintenance unit, and a main-scan moving unit. The liquid discharge heads 69 discharge the liquid and apply the liquid to an object (the recording medium) such as the sheet P. FIG. 3 is a schematic diagram illustrating an example of the configuration of the head array according to Embodiment 1. The head array 600 illustrated in FIG. 3 includes the plurality of head units 610 (the head units 610K, 610C, 610M, and 610Y). The head unit 610 discharges liquid (ink) of basic colors of, for example, black (K), cyan (C), magenta (M), and yellow (Y) and forms an image on the sheet P. The head array 600 can further include a head unit that discharges liquid (ink) of a special color such as orange or violet, a head unit that discharges liquid for overcoating for gloss level improvement or other treatment, or the like.

In the head unit 610, the plurality of liquid discharge heads 69 is in a staggered arrangement. The liquid discharge heads 69 are arranged along a sub-scanning direction (the Z axis direction) orthogonal to the main scanning direction (the X axis direction), in which the conveyor drum 61 rotates. As illustrated in FIG. 3, in each head unit 610, the plurality of liquid discharge heads 69 is arranged in two rows in a zigzag manner. The head unit 610K includes head rows 631K and 632K. The head unit 610C includes head rows 631C and 632C. The head unit 610M includes head rows 631M and 632M. The head unit 610Y includes head rows 631Y and 632Y. The head rows 631K, 631C, 631M, and 631Y are collectively referred to as "head rows 631", and the head rows 632K, 632C, 632M, and 632Y are collectively referred to as "head row 632". The liquid discharge heads 69 in different rows are shifted by a half pitch. For example, the liquid discharge heads 69 of the head row 631K are shifted by a half pitch from the liquid discharge heads 69 of the head row 632K. The plurality of liquid discharge heads 69 is arranged along a first direction (the Z axis direction). Specifically, the liquid discharge heads 69 are arranged such that, when viewed from a second direction (X axis direction) orthogonal to the first direction, the liquid discharge heads 69 adjacent in the first direction overlap with each other in some areas.

Figure 3:
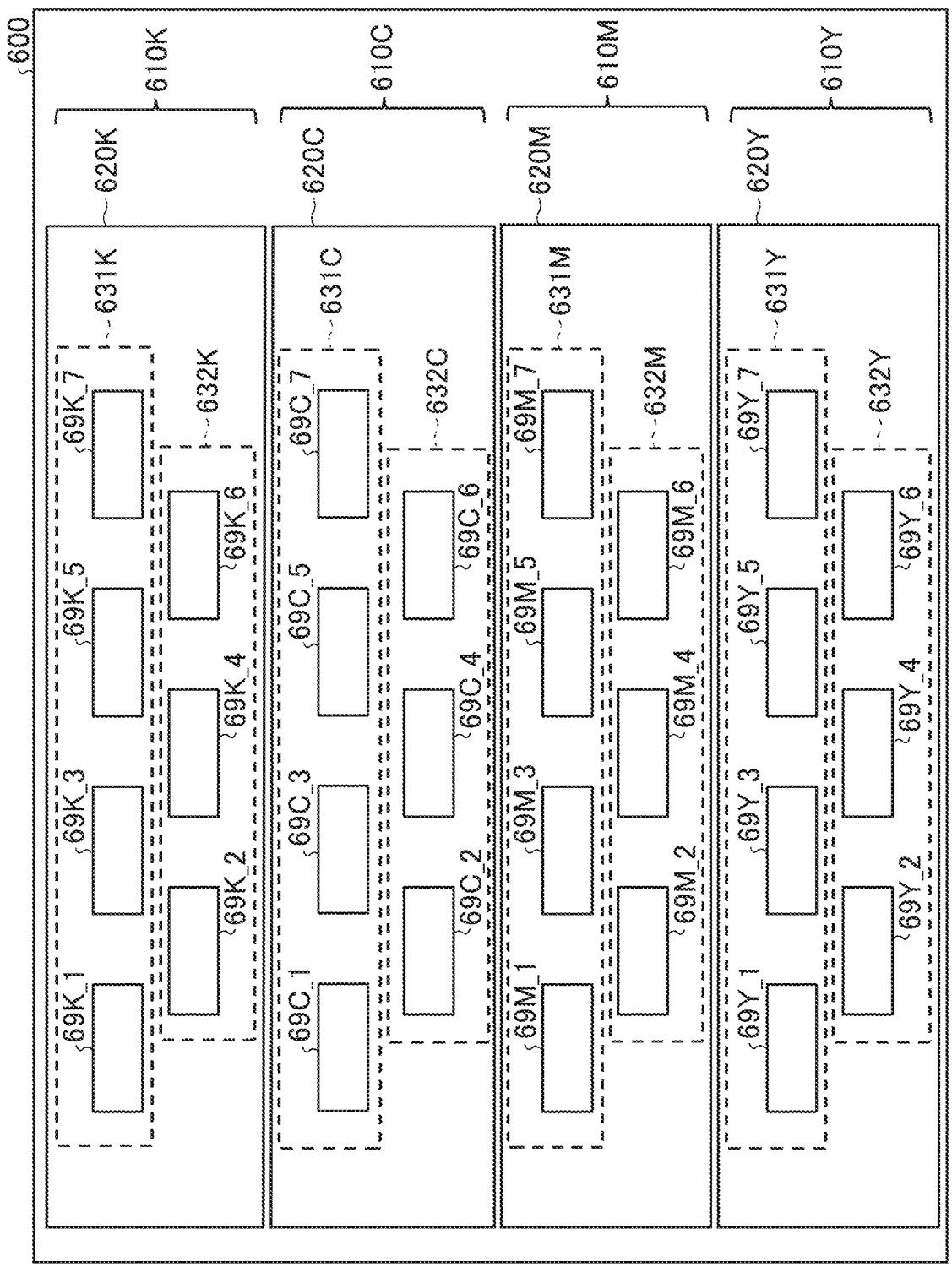
FIG. 3 is a schematic diagram illustrating an example of a configuration of a head array of the printer illustrated in FIG. 2.

In FIG. 3, the head unit 610K includes first to seventh liquid discharge heads 69K_1 to 69K_7. The head unit 610C includes first to seventh liquid discharge heads 69C_1 to 69C_7. The head unit 610M includes first to seventh liquid discharge heads 69M_1 to 69M_7. The head unit 610Y includes first to seventh liquid discharge heads 69Y_1 to 69Y_7. The first to seventh liquid discharge heads 69K_1 to 69K_7, 69C_1 to 69C_7, 69M_1 to 69M_7, and 69Y_1 to 69Y_7 are also simply referred to as "heads 69_1 to head 69_7" when color discrimination is not necessary.

In the example illustrated in FIG. 3, one (e.g., the head row 631) of the two rows of the head unit 610 has four liquid discharge heads 69, and the other (e.g., the head row 632) has three liquid discharge heads 69. The number of liquid discharge heads 69 in the rows of each head unit 610 is not limited thereto but can be greater than four and three, respectively. Alternatively, the same number of liquid discharge heads 69 can be provided in each row. The number of rows of the liquid discharge heads 69 in each head unit 610 is not limited thereto. Alternatively, the liquid discharge heads 69 can be arranged in three or more rows in a staggered arrangement.

Depending on the liquid discharge characteristics or the like, the amount of liquid discharged therefrom may be different among the plurality of liquid discharge heads 69. Therefore, as a result of printing, a color difference (density unevenness) occurs between the liquid discharge heads 69 that has output the liquid onto the sheet P or among nozzles in one liquid discharge head 69. Therefore, the print processing system 2 requires density adjustment for eliminating or alleviating uneven density. FIGS. 4A and 4B are schematic diagrams illustrating uneven density in a printed image. FIG. 4A is a diagram illustrating an example of a print result before density adjustment is performed. In FIG. 4A, the density in the image formed on the sheet P is uneven along the arrangement direction (the Z axis direction) of the liquid discharge heads 69. FIG. 4B is a diagram illustrating an example of a print result after the density adjustment. In FIG. 4B, the density unevenness in FIG. 4A is resolved and the density in the formed image is uniform in the arrangement direction (the Z axis direction) of the liquid discharge head 69. Thus, the print processing system 2 corrects the density difference of the liquid discharged from each liquid discharge head 69 and the density difference of the liquid applied near the boundary between the liquid discharge heads 69, thereby equalizing the density (color) of the image formed on the recording medium such as the sheet P.

Hardware Configuration

Figure 5:
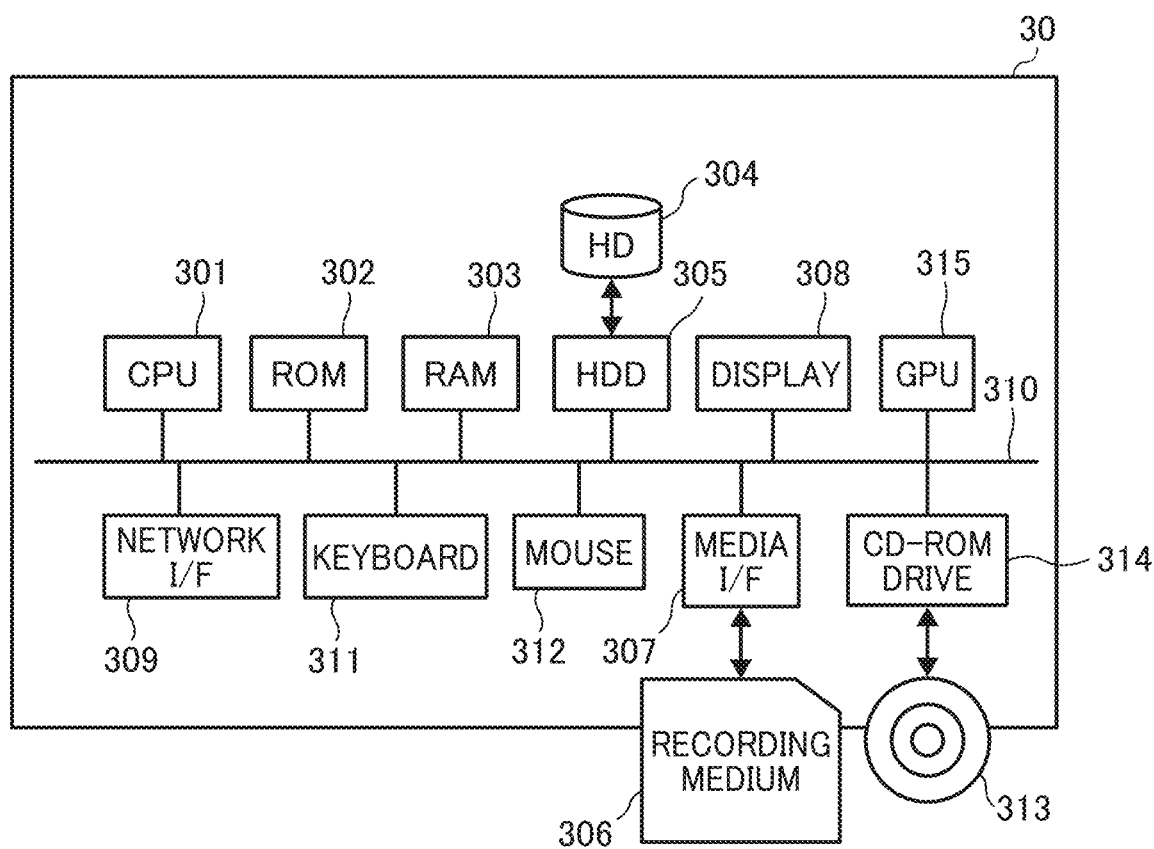
FIG. 5 is a block diagram illustrating an example of a hardware configuration of a printing control apparatus according to Embodiment 1.

Referring to FIG. 5, a hardware configuration of the printing control apparatus 30 is described. FIG. 5 is a block diagram illustrating an example of the hardware configuration of the printing control apparatus according to Embodiment 1. The hardware configuration illustrated in FIG. 5 can be the same among the different embodiments. Alternatively, an element can be added thereto or deleted therefrom as necessary.

As illustrated in FIG. 5, the printing control apparatus 30 includes a central processing unit (CPU) 301 that controls the overall operation of the printing control apparatus 30, a read only memory (ROM) 302 that stores programs, such as an initial program loader (IPL), used for driving the CPU 301, a random access memory (RAM) 303 used as a work area of the CPU 301, a hard disk (HD) 304 for storing various data such as a position information management program, a hard disk drive (HDD) 305 for controlling reading various data from the HD 304 and writing data therein under the control of the CPU 301, and a media interface (I/F) 307 for controlling data reading to or data writing (storing) on a recording medium 306 such as a flash memory. The printing control apparatus 30 further includes a display 308 to display various information such as a cursor, a menu, a window, characters, and images, a network interface (I/F) 309 for data communication via a communication network, a keyboard 311 that includes a plurality of keys to allow a user to input characters, numbers, and various types of instructions, and a mouse 312 to allow the user to input an instruction for selecting and executing various instructions, selecting a target to be processed, or moving the cursor. The printing control apparatus 30 further includes a compact disc read only memory (CD-ROM) drive 314 for controlling various data reading from or various data writing to a CD-ROM 313 as an example of a removable recording medium, a graphics processing unit (GPU) 315 having an arithmetic function corresponding to an application programming interface (API) such as open graphics library (OpenGL), to realize high-speed image processing operation, and a bus line 310 that electrically connects the hardware elements mentioned above. Examples of the bus line 310 include an address bus and a data bus.

The hardware configuration of the communication terminal 10 is the same as the hardware configuration of the printing control apparatus 30 illustrated in FIG. 5, and the description thereof will be omitted.

Figure 6:
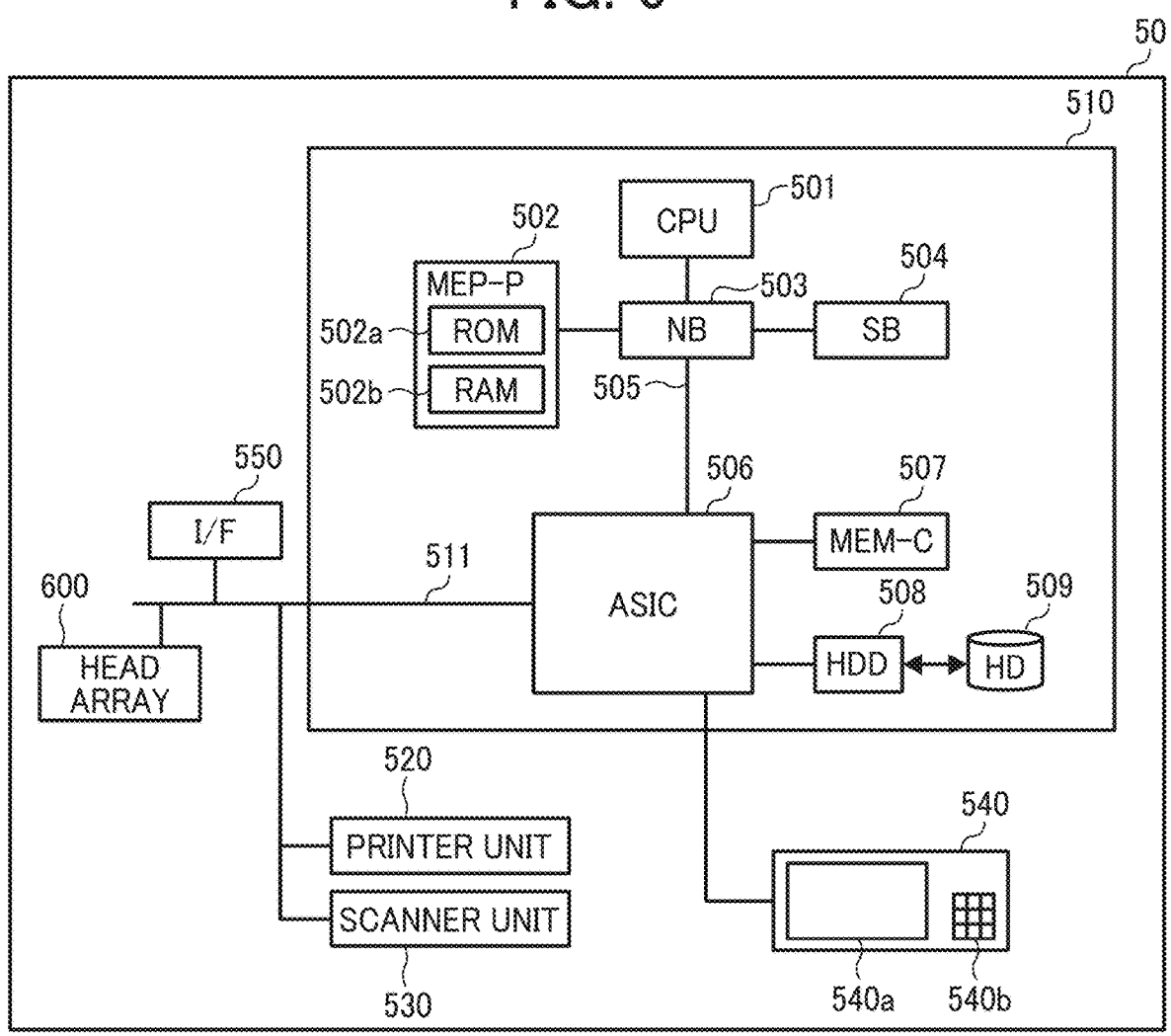
FIG. 6 is a block diagram illustrating an example of a hardware configuration of the printer according to Embodiment 1.

Referring to FIG. 6, a hardware configuration of the printer 50 is described. FIG. 6 is a block diagram illustrating an example of the hardware configuration of the printer according to Embodiment 1. The hardware configuration illustrated in FIG. 6 can be the same among different embodiments. Alternatively, an element can be added thereto or deleted therefrom as necessary.

The printer 50 includes a controller 510, a printer unit 520 (an image forming device), a scanner unit 530 (a reading device), a control panel 540, an I/F 550, and the head array 600. The printer unit 520 and the scanner unit 530 are mechanical structures to execute image formation processing in the printer 50. The control panel 540 includes a panel display section 540a, such as a touch panel, and an input section 540b. The panel display section 540a displays current set values and selection screens and accepts an input from the user (an operator). The input section 540b includes a numeric keypad for accepting setting values of conditions (e.g., density setting) related to image formation, a start key for accepting a copy start instruction, and the like. The controller 510 controls the entire operation of the printer 50. For example, the controller 510 controls drawing, communication, input from the control panel 540, and the like. As illustrated in FIG. 3, the head array 600 is a recording head including the plurality of liquid discharge heads 69. In response to an instruction via an application switching key on the control panel 540, the printer 50 selectively performs a document box function, a copy function, a print function, and a facsimile function. When the document box function is selected, the operation mode is changed to a document box mode to store document data. With selection of the copy function, the operation mode is changed to a copy mode. With selection of the print function, the operation mode is changed to a printer mode. With selection of the facsimile function, the operation mode is changed to a facsimile mode.

The controller 510 includes a central processing unit (CPU) 501 as a main component of a computer, a system memory 502 (MEM-P), a north bridge (NB) 503, a south bridge (SB) 504, an application specific integrated circuit (ASIC) 506, a local memory 507 (MEM-C), an HDD 508, and an HD 509 (a memory). In the controller 510, the NB 503 and the ASIC 506 are connected via an Accelerated Graphics Port (AGP) bus 505.

The CPU 501 is a controller that controls overall operation of the printer 50. The NB 503 is a bridge connecting the CPU 501 to the system memory 502, the SB 504, and the AGP bus 505. The NB 503 includes a memory controller for controlling data reading from and data writing in the system memory 502, a peripheral component interconnect (PCI) master, and an AGP target.

The system memory 502 includes a ROM 502a, which is a memory to store program and data for operating the controller 510, and a RAM 502b for developing programs and data and storing drawing data in printing. Alternatively, the program stored in the RAM 502b can be stored, for distribution, on any desired recording medium, such as a CD-ROM, a floppy disk (FD), a compact disc-recordable (CD-R), or a digital versatile disc (DVD), in a format installable on and executable by a computer. The SB 504 is a bridge connecting the NB 503 and a PCI device or a peripheral device. The ASIC 506 is an integrated circuit (IC) dedicated to image processing and includes hardware elements for image processing. The ASIC 506 serves as a bridge connecting the AGP bus 505, a PCI bus 511, the HDD 508, and the local memory 507 to each other. The ASIC 506 includes a PCI target, an AGP master, an arbiter (ARB) that is a core of the ASIC 506, a memory controller for controlling the local memory 507, a plurality of direct memory access controllers (DMACs) capable of rotation or the like of image data with a hardware logic, and a PCI unit that transfers data between the printer unit 520 and the scanner unit 530 through the PCI bus 511. The ASIC 506 can be configured to connect to a universal serial bus (USB) interface (I/F), an interface of the Institute of Electrical and Electronics Engineers 1394 (IEEE1394), or both.

The local memory 507 is used as a buffer for image data to be copied or code image. The HD 509 is a storage to store various image data, font data for printing, and form data. The HDD 508 controls data reading from or data writing to the HD 509 under control of the CPU 501. The AGP bus 505 is a bus interface for a graphics accelerator card and is devised for accelerating graphic processing. The AGP bus 505 directly accesses the system memory 502 with high throughput to accelerate the graphics accelerator card.

Figure 7:
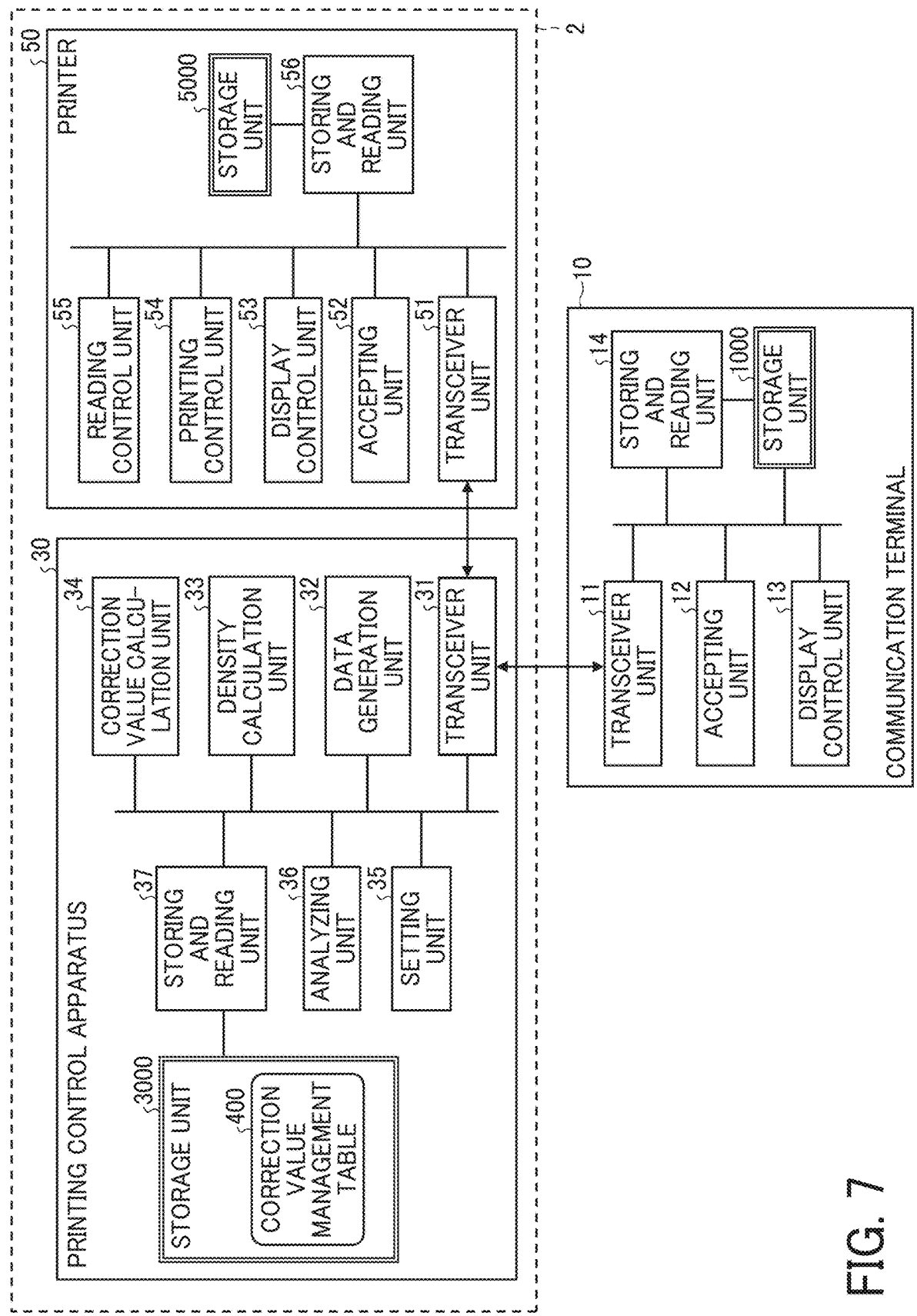
FIG. 7 is a block diagram illustrating an example of a functional configuration of the printing system according to Embodiment 1.
Figure 8:
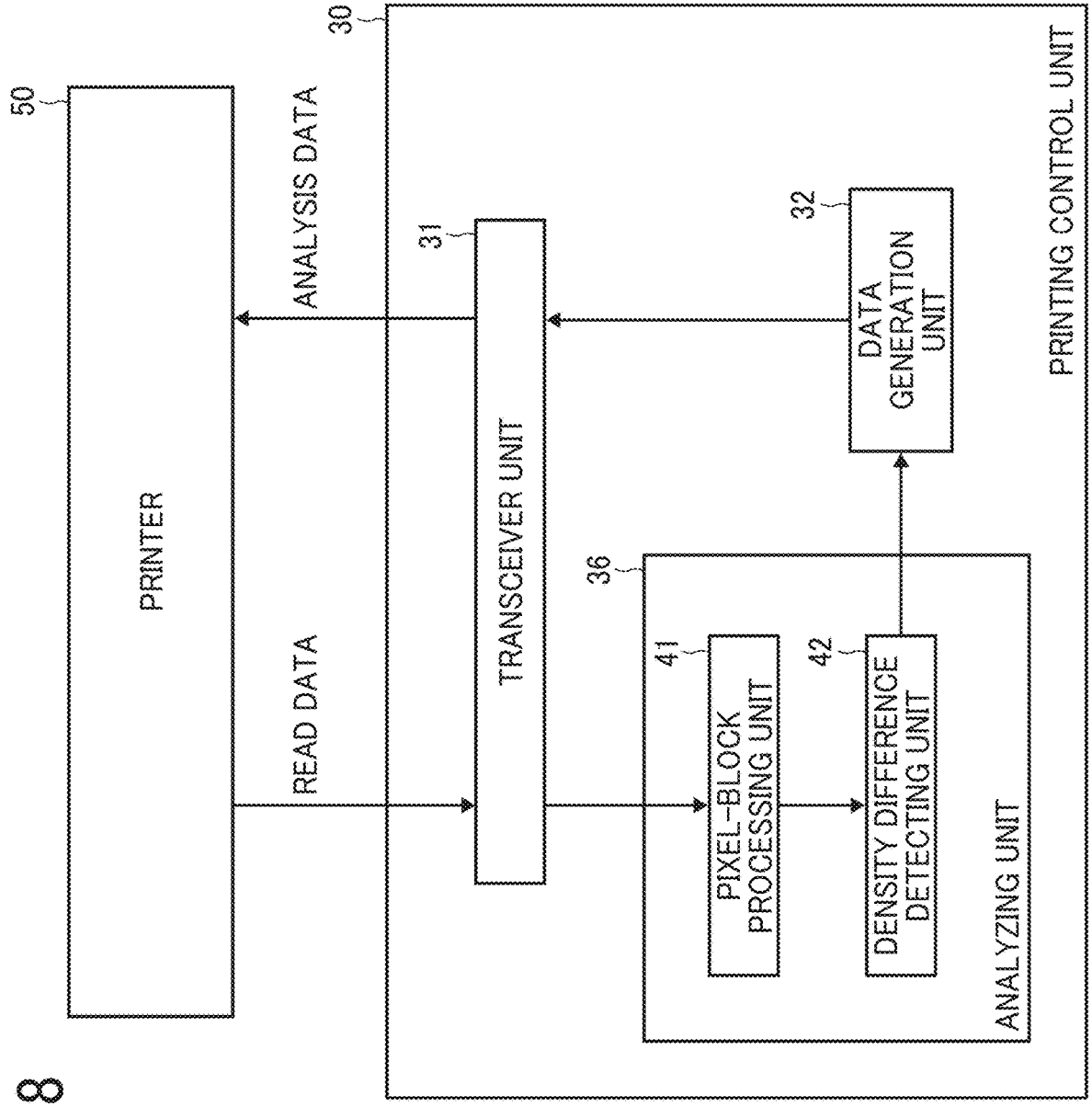
FIG. 8 is a block diagram illustrating an example of a detailed configuration of an analyzing unit of the printing control apparatus according to Embodiment 1.

Referring to FIGS. 7 and 8, a functional configuration of the printing system 1 is described. FIG. 7 is a block diagram illustrating an example of the functional configuration of the printing system according to Embodiment 1.

A configuration of the communication terminal 10 is described. Functions implemented by the communication terminal 10 illustrated in FIG. 7 include a transceiver unit 11, an accepting unit 12, a display control unit 13, a storing and reading unit 14, and a storage unit 1000.

The transceiver unit 11 functions to exchange various data with the printing control apparatus 30 via the LAN 8. The transceiver unit 11 is implemented, for example, by the network I/F 309 and a program executed by the CPU 301 illustrated in FIG. 5.

The accepting unit 12 functions to accept user input via an input device, such as the keyboard 311 illustrated in FIG. 5. The accepting unit 12 is implemented by, for example, a program executed by the CPU 301 illustrated in FIG. 5. The display control unit 13 functions to display various screen information on the display 308 illustrated in FIG. 5. For example, the display control unit 13 causes the display 308 to display, with a web browser, an operation screen or the like for accepting an input operation by the user. The display control unit 13 causes the display 308 to display a web page with, for example, hypertext markup language (HTML). The display control unit 13 is implemented by, for example, the display 308 illustrated in FIG. 5 and a program executed by the CPU 301 illustrated in FIG. 5.

The storing and reading unit 14 functions to store various data in and read various data from the storage unit 1000. The storing and reading unit 14 is implemented by, for example, a program executed by the CPU 301 illustrated in FIG. 5. The storage unit 1000 is implemented, for example, by the ROM 302 or the HD 304 illustrated in FIG. 5, or the like.

A functional configuration of the printing control apparatus 30 is described. The functions implemented by the printing control apparatus 30 illustrated in FIG. 7 include a transceiver unit 31, a data generation unit 32, a density calculation unit 33, a correction value calculation unit 34, a setting unit 35, an analyzing unit 36, a storing and reading unit 37, and a storage unit 3000.

The transceiver unit 31 functions to exchange various data with the communication terminal 10 or the printer 50. The transceiver unit 31 transmits and receives various data to and from the communication terminal 10 via the LAN 8, for example. In addition, the transceiver unit 31 transmits and receives various data to and from the printer 50 via the dedicated line 9, for example. The transceiver unit 31 is implemented, for example, by the network I/F 309 and a program executed by the CPU 301 illustrated in FIG. 5.

The data generation unit 32 functions to generate data to be transmitted to the printer 50. For example, the data generation unit 32 generates processing data for performing printing process in the printer 50. The data generation unit 32 is implemented by, for example, a program executed by the CPU 301 illustrated in FIG. 5.

The density calculation unit 33 functions to calculate the image density of the read data transmitted from the printer 50. The density calculation unit 33 calculates the density of each pixel of the read data (scan data) transmitted from the printer 50. The density calculation unit 33 is implemented by, for example, a program executed by the CPU 301 illustrated in FIG. 5. The density calculation unit 33 is an example of a calculation unit.

The correction value calculation unit 34 functions to calculate a correction value of an output from the liquid discharge head 69 to the printing area of each pixel based on the image density calculated by the density calculation unit 33. Specifically, an output value is set as the amount of liquid discharged from the liquid discharge head 69. The correction value calculation unit 34 calculates a correction value for correcting the output value of the liquid discharged, based on the difference between the output value that has been set and the density per each pixel of the image included in the read data (scan data). The correction value calculation unit 34 is implemented by, for example, a program executed by the CPU 301 illustrated in FIG. 5. The correction value calculation unit 34 is an example of a correction unit.

The setting unit 35 functions to set various setting values in the printing operation of the printer 50. The setting unit 35 sets thresholds, as setting values, for allowable density difference or density variations, sheet size, and the like. The setting unit 35 is implemented by, for example, a program executed by the CPU 301 illustrated in FIG. 5.

The analyzing unit 36 functions to analyze the gradation-density characteristics of the read data based on the image density calculated by the density calculation unit 33. The analyzing unit 36 is implemented by, for example, a program executed by the CPU 301 illustrated in FIG. 5.

The storing and reading unit 37 functions to store various data in the storage unit 3000 or reading various data from the storage unit 3000. The storing and reading unit 37 is implemented by, for example, a program executed by the CPU 301 illustrated in FIG. 5. The storage unit 3000 is implemented, for example, by the ROM 302 illustrated in FIG. 5, the HD 304 illustrated in FIG. 5, or the like. Further, the storage unit 3000 stores a correction value management table 400.

The configuration of the analyzing unit 36 is described in further detail below. FIG. 8 is a block diagram illustrating an example of a detailed configuration of the analyzing unit of the printing control apparatus according to Embodiment 1. The analyzing unit 36 includes a pixel-block processing unit 41 and a density difference detecting unit 42.

The pixel-block processing unit 41 functions to calculate the image density of the read data received by the transceiver unit 31 for each block of pixels (i.e., unit pixel block serving as a predetermined unit area of an image) including a predetermined number of pixels, for example, set by a manufacturer of the print processing system 2.

The density difference detecting unit 42 functions to detect the density difference between adjacent pixel blocks based on the density calculated, per unit pixel block, by the pixel-block processing unit 41. When the density difference between adjacent pixel blocks is equal to or greater than the threshold set by the setting unit 35, the density difference detecting unit 42 detects a density difference that is equal to or greater than an allowable range.

Correction Value Management Table

Figure 9:
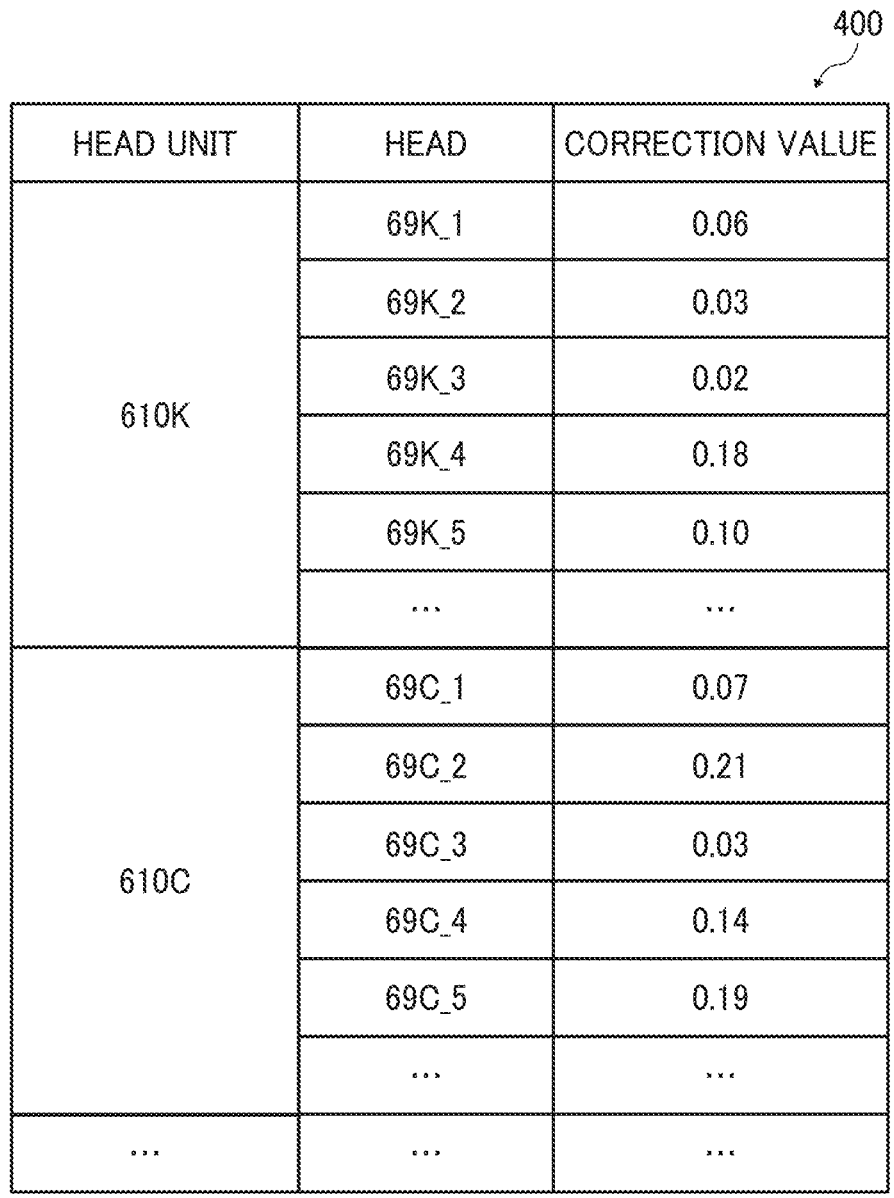
FIG. 9 illustrates an example of a correction value management table according to Embodiment 1.

Descriptions are given below of the correction value management table 400 with reference to FIG. 9. FIG. 9 illustrates an example of the correction value management table according to Embodiment 1. The correction value management table 400 stores the correction value for correcting the output value of the liquid discharge from the liquid discharge head 69, for each liquid discharge head 69.

The correction value management table 400 illustrated in FIG. 9 stores the correction value in association with the identification information for identifying the head unit 610 and the liquid discharge head 69 disposed in the head unit 610. The correction values included in the correction value management table 400 are updated each time density adjustment completes.

A functional configuration of the printer 50 is described.

Functions implemented by the printer 50 illustrated in FIG. 7 include a transceiver unit 51, an accepting unit 52, a display control unit 53, a printing control unit 54, a reading control unit 55, a storing and reading unit 56, and a storage unit 5000.

The transceiver unit 51 functions to exchange various data with the printing control apparatus 30 via the dedicated line 9. The transceiver unit 51 is implemented by, for example, the I/F 550 illustrated in FIG. 6, and programs executed by the ASIC 506 and the CPU 501 illustrated in FIG. 6.

The accepting unit 52 functions to accept user input via the input device (for example, the input section 540*b*) of the control panel 540 illustrated in FIG. 6. The accepting unit 52 is implemented by, for example, programs executed by the ASIC 506 and the CPU 501 illustrated in FIG. 6. The accepting unit 52 is an example of an accepting unit.

The display control unit 53 functions to display various screens on the control panel 540 (for example, the panel display section 540*a*) illustrated in FIG. 6. For example, the display control unit 53 causes the control panel 540 to display an operation screen or the like that accepts an input operation by the user, using a web browser. The display control unit 53 causes the control panel 540 to display, for example, a web page with HTML. The display control unit 53 is implemented by, for example, the control panel 540 illustrated in FIG. 6, and programs executed by the ASIC 506 and the CPU 501 illustrated in FIG. 6. The display control unit 53 is an example of an output unit.

The printing control unit 54 functions to control printing of an image on a recording medium based on the image data transmitted from the printing control apparatus 30. For example, the printing control unit 54 controls the print timing of the data transmitted from the printing control apparatus 30 and performs printing adjustment based on an adjustment value set by the user. The printing control unit 54 is implemented by, for example, the printer unit 520 illustrated in FIG. 6, and programs executed by the ASIC 506 and the CPU 501. The printing control unit 54 is an example of the output unit.

The reading control unit 55 functions to control reading of data by the scanner unit 530. For example, the reading control unit 55 reads the image data printed under control of the printing control unit 54, using the scanner unit 530. The reading control unit 55 is implemented by, for example, the scanner unit 530 illustrated in FIG. 6, and programs executed by the ASIC 506 and the CPU 501 illustrated in FIG. 6. The reading control unit 55 is an example of a reading unit.

The storing and reading unit 56 functions to store various data in the storage unit 5000 or reading various data from the storage unit 5000. The storing and reading unit 56 is implemented by, for example, programs executed by the ASIC 506 and the CPU 501. The storage unit 5000 is implemented by the system memory 502, the local memory 507, the HD 509, or the like illustrated in FIG. 6, for example.

Figure 10:
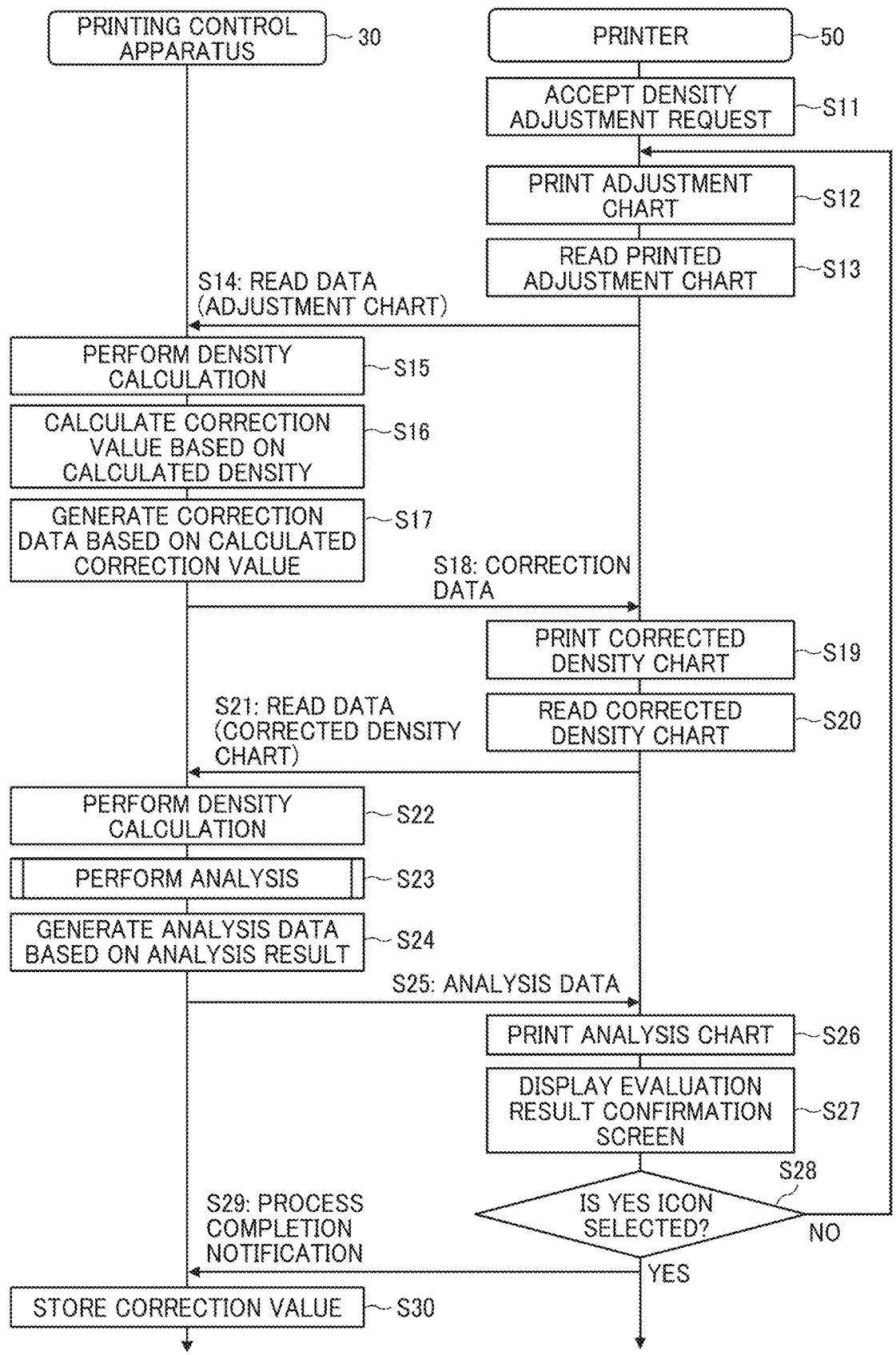
FIG. 10 is a sequence chart of an example of density adjustment performed in a print processing system according to Embodiment 1.

Referring to FIGS. 10 to 18, descriptions are given below of the density adjusting method in the print processing system according to Embodiment 1. FIG. 10 is a sequence chart of an example of density adjustment performed in the print processing system according to Embodiment 1.

In S11, the accepting unit 52 of the printer 50 accepts an input of a density adjustment request from the user. Specifically, the user requests the start of the density adjustment on the operation screen displayed on the control panel 540 by the display control unit 53. The accepting unit 52 accepts an input made on the operation screen displayed on the control panel 540.

Figure 11A:
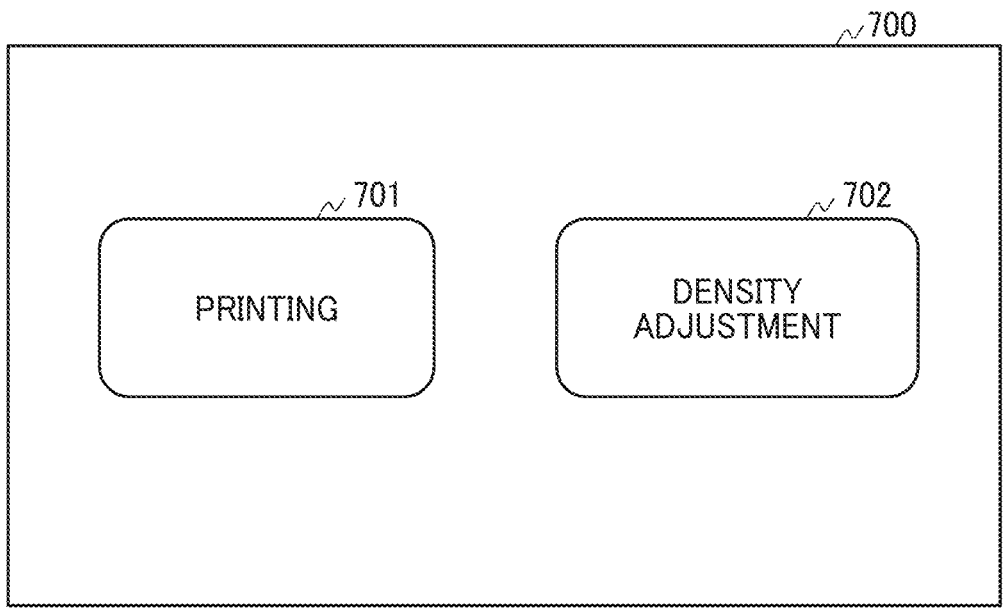
FIGS. 11A and 11B are views of examples of operation screens displayed on the printer according to Embodiment 1.
Figure 11B:
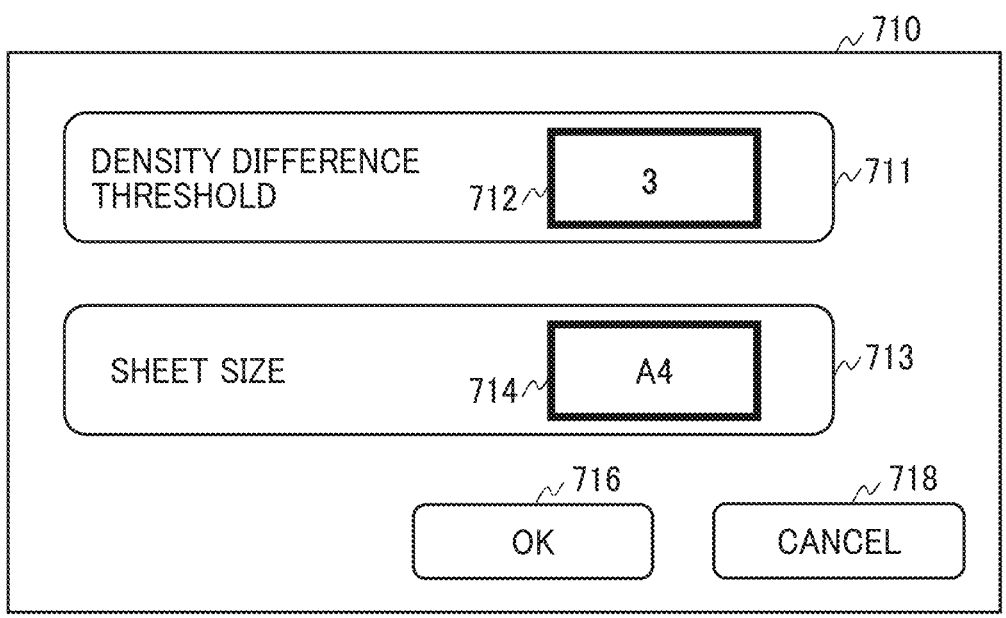

Descriptions are given below of operation screens displayed on the control panel 540 of the printer 50, with reference to FIGS. 11A and 11B. FIGS. 11A and 11B illustrate examples of operation screens displayed on the printer according to Embodiment 1. An operation screen 700 illustrated in FIG. 11A is displayed on the control panel 540, for example, when the printer 50 is activated. The operation screen 700 includes a selection icon 701 for requesting printing and a selection icon 702 for requesting density adjustment. When the accepting unit 52 accepts an input to the selection icon 701 by the operator, the printer 50 executes printing on a recording medium. By contrast, when the accepting unit 52 accepts an input to the selection icon 702 by the operator, the printer 50 performs density adjustment of the image formed by the liquid discharged from the liquid discharge heads 69.

FIG. 11B illustrates an example of a setting screen 710 for setting parameters and the like used for density adjustment. The setting screen 710 illustrated in FIG. 11B is displayed on the control panel 540 when the accepting unit 52 accepts an input to the selection icon 702 on the operation screen 700. The setting screen 710 includes a threshold setting area 711 and a sheet size setting area 713. The threshold setting area 711 is for setting a threshold relating to image density based on which whether or not to perform density adjustment is determined. The sheet size setting area 713 is for accepting selecting of the size of a sheet on which an image is to be printed by the printer 50. The setting screen 710 further includes an OK icon 716 to be pressed to start the density adjustment and a cancel icon 718 to be pressed to cancel the density adjustment.

The threshold setting area 711 includes a setting field 712 in which a threshold for detecting a density difference among pixels of an image formed on a recording medium can be set. The user inputs a desired threshold in the setting field 712 of the threshold setting area 711, to set the threshold. The threshold setting area 711 can be a selective field for allowing a user to select one of numerical values or an input field in which the user directly inputs a numerical value.

The sheet size setting area 713 includes a setting field 714 in which the size of the sheet (a recording medium) on which the printer 50 forms an image, according to the image data, can be set. The user inputs a sheet size in the setting field 714 of the sheet size setting area 713, to set the sheet size. The sheet size setting area 713 can be a selective field for allowing a user to select one of sheet sizes or an input field in which the user directly inputs a sheet size.

When accepting an input to the OK icon 716 in a state in which numerical values are respectively input to the setting fields 712 and 714, the printer 50 accepts a density adjustment request for the liquid discharge heads 69.

The parameters that can be set on the setting screen 710 are not limited thereto. Alternatively, on the setting screen 710, the head unit 610 being the target of density adjustment or advanced settings (e.g., double-sided printing or single-sided printing, combined printing, etc.) of printing in the printer 50 can be set.

In S12, in response to an acceptance of the density adjustment request by the accepting unit 52, the printing control unit 54 of the printer 50 performs, with the printer unit 520, the printing process of an adjustment chart 70 used for the density adjustment. The printer 50 stores in advance the printing parameters for printing the adjustment chart 70 in the storage unit 5000. The printing control unit 54 reads the printing parameters from the storage unit 5000 via the storing and reading unit 56, to execute the printing process of the adjustment chart 70. In S13, the reading control unit 55 of the printer 50 causes the scanner unit 530 to read the printed adjustment chart 70. The printing process by the printing control unit 54 and the reading process by the reading control unit 55 are executed as a series of operations.

In S14, the transceiver unit 51 of the printer 50 transmits the read data of the adjustment chart 70, read by the reading control unit 55, to the printing control apparatus 30. The transceiver unit 31 of the printing control apparatus 30 receives the read data transmitted from the printer 50.

Figure 12:
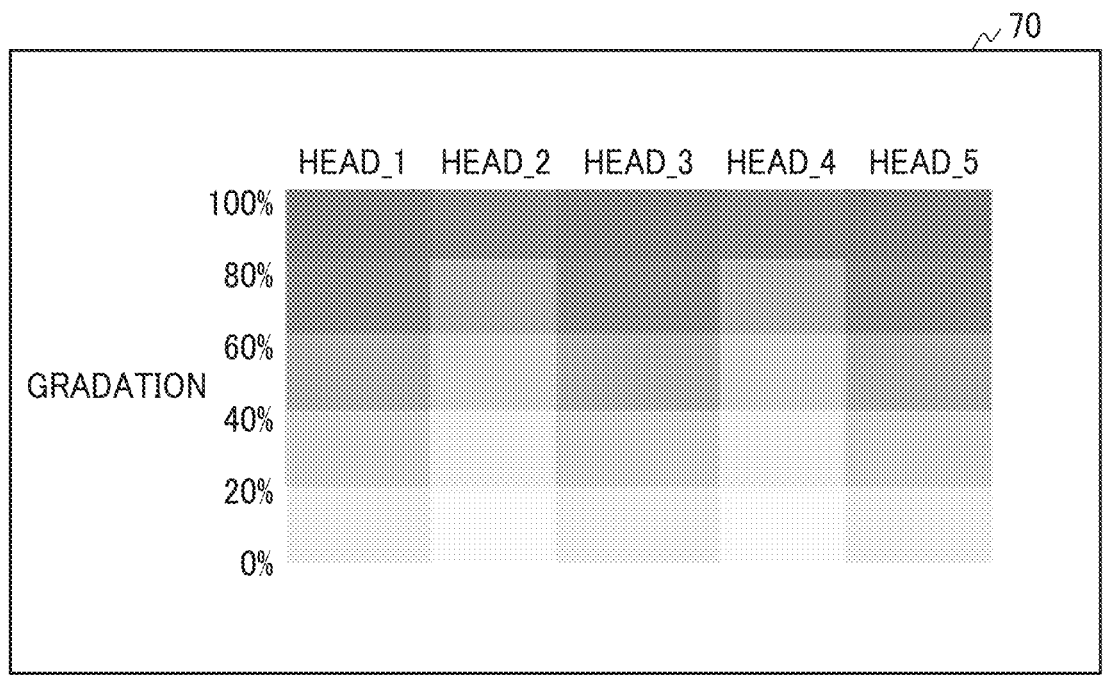
FIG. 12 is a diagram illustrating an example of an adjustment chart printed in the printer according to Embodiment 1.

FIG. 12 illustrates an example of the adjustment chart 70 printed by the printer 50 according to Embodiment 1. In FIG. 12, the lateral direction of the adjustment chart 70 matches the direction in which the liquid discharge heads 69 are lined, and the vertical direction matches the direction in which the recording medium is conveyed. The vertical direction indicates a gradation of the image.

In FIG. 12, segments arranged in the lateral direction of the adjustment chart 70 corresponds to the respective printing areas (liquid discharge areas) of the liquid discharge heads 69_1 to 69_5. Head_1 to head_5 in FIG. 12 correspond to the liquid discharge heads 69K_1 to 69K_5 in FIG. 3, respectively. As illustrated in FIG. 12, the gradation-density characteristics of head_1 to head_5 (the liquid discharge heads 69_1 to 69_5) have variations. Accordingly, the density of the printed adjustment chart 70 is uneven. Therefore, the print processing system 2 requires correction to equalize the printing densities among the liquid discharge heads 69, to eliminate or alleviate image density variations. Note that the adjustment chart 70 is not limited to the image formed with liquid discharged from the liquid discharge heads 69_1 to 69_5. The gradation-density characteristics are different among the liquid discharge heads 69 and are often not linear for all gradation segments. Therefore, preferably, the adjustment chart 70 is printed with the entire width of the head unit 610 and data is acquired for a plurality of gradations.

In S15, the density calculation unit 33 of the printing control apparatus 30 calculates the image density of the adjustment chart 70 based on the read data of the adjustment chart 70 received by the transceiver unit 31. The density calculation unit 33 converts the read data in the red, green, and blue (RGB) format to a density. As illustrated in FIG. 13A, the degree of darkness and brightness (degree of shade) of the image is determined by the amount of the liquid (ink) in a given area of the recording medium, that is, the amount of liquid (ink) in one pixel. FIG. 13B illustrates an image of the adjustment chart actually printed on a sheet. As illustrated in FIGS. 13A and 13B, halftone dots are small in a bright portion of the image, and halftone dots are larger in a dark portion of the image.

FIG. 13C illustrates 8-bit values of the R component at the time of reading the image data. In FIG. 13C, it can be known that the density varies between the maximum value (56) and the minimum value (20). Therefore, the density calculation unit 33 handles a plurality of pixels in a cluster to calculate the density of the read data. The following description is on the assumption that the density calculation unit 33 converts the RGB values of the read data into the 8-bit density (luminance data).

In S16, the correction value calculation unit 34 of the printing control apparatus 30 uses the density calculated by the density calculation unit 33, to calculate a correction value for each of the liquid discharge heads 69.

In S17, the data generation unit 32 of the printing control apparatus 30 generates correction data for the printing by the printer 50, based on the correction value calculated by the correction value calculation unit 34.

In S18, the transceiver unit 31 of the printing control apparatus 30 transmits the correction data generated by the data generation unit 32 to the printer 50. Then, the transceiver unit 51 of the printer 50 receives the correction data transmitted from the printing control apparatus 30.

In S19, the printing control unit 54 of the printer 50 executes a printing process of a corrected density chart 80 as a result of density correction based on the correction data received by the transceiver unit 51. In S20, the reading control unit 55 of the printer 50 causes the scanner unit 530 to read the printed corrected density chart 80 (an example of reading). Similar to the description above, the printing process by the printing control unit 54 and the reading process by the reading control unit 55 are executed as a series of operations. The corrected density chart 80 is an example of a read image.

In S21, the transceiver unit 51 of the printer 50 transmits the read data of the corrected density chart 80 read by the reading control unit 55 to the printing control apparatus 30. The transceiver unit 31 of the printing control apparatus 30 receives the read data transmitted from the printer 50.

Figure 14:
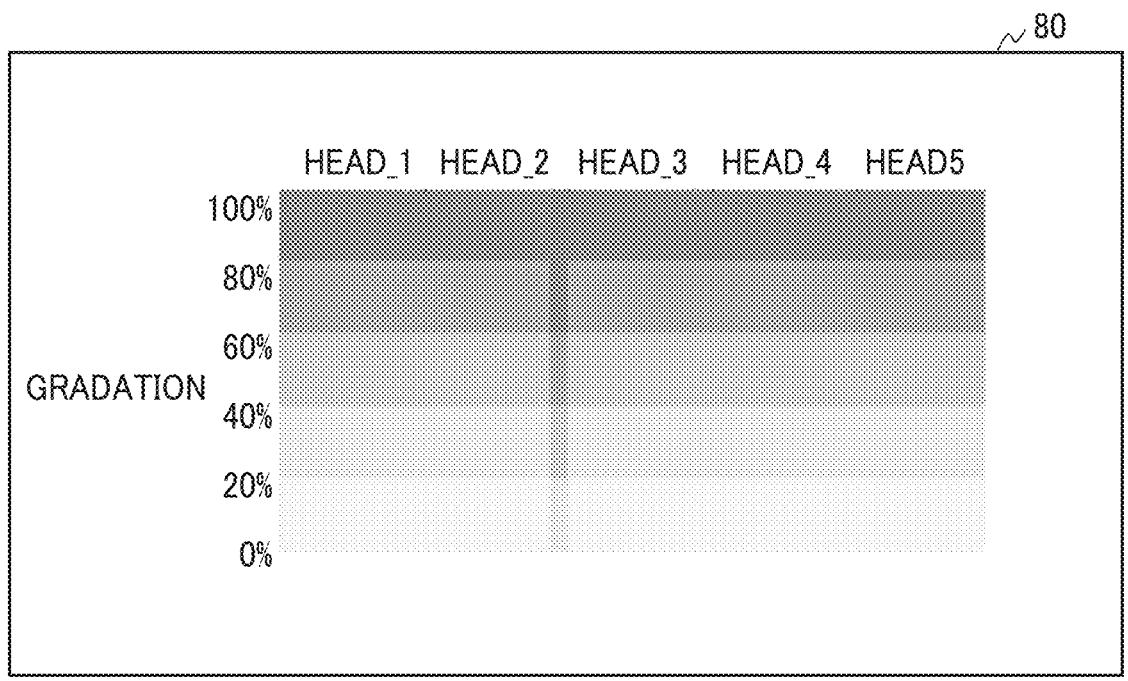
FIG. 14 is a diagram illustrating an example of a corrected density chart printed in the printer according to Embodiment 1.

FIG. 14 illustrates an example of a corrected density chart printed by the printer according to Embodiment 1. The corrected density chart 80 illustrated in FIG. 14 corresponds to the printing area (the liquid discharge area) of the adjustment chart 70 illustrated in FIG. 12.

Similar to FIG. 12, in FIG. 14, head_1 to head_5 correspond to the liquid discharge heads 69K_1 to 69K_5 in FIG. 3, respectively. On the corrected density chart 80 illustrated in FIG. 14, the variations in the gradation-density characteristics of the liquid discharge heads 69_1 to 69_5 (corresponding to head_1 to head_5) are corrected from the adjustment chart 70 illustrated in FIG. 12. By contrast, on the corrected density chart 80 illustrated in FIG. 14, density unevenness remains in the region (around the boundary) between head_2 and head_3. When the user visually checks the result of density correction on the corrected density chart 80, recognition of remaining density unevenness may be difficult. Therefore, the print processing system 2 performs the following analysis process, using the corrected density chart 80 as the result of image density correction, and reports an uneven density portion to the user.

In S22, the density calculation unit 33 of the printing control apparatus 30 calculates the image density of the corrected density chart 80 based on the read data of the corrected density chart 80 received by the transceiver unit 31 (an example of calculating). Since the density calculation process in the density calculation unit 33 is the same as the process in S15, the description thereof will be omitted.

Figure 15:
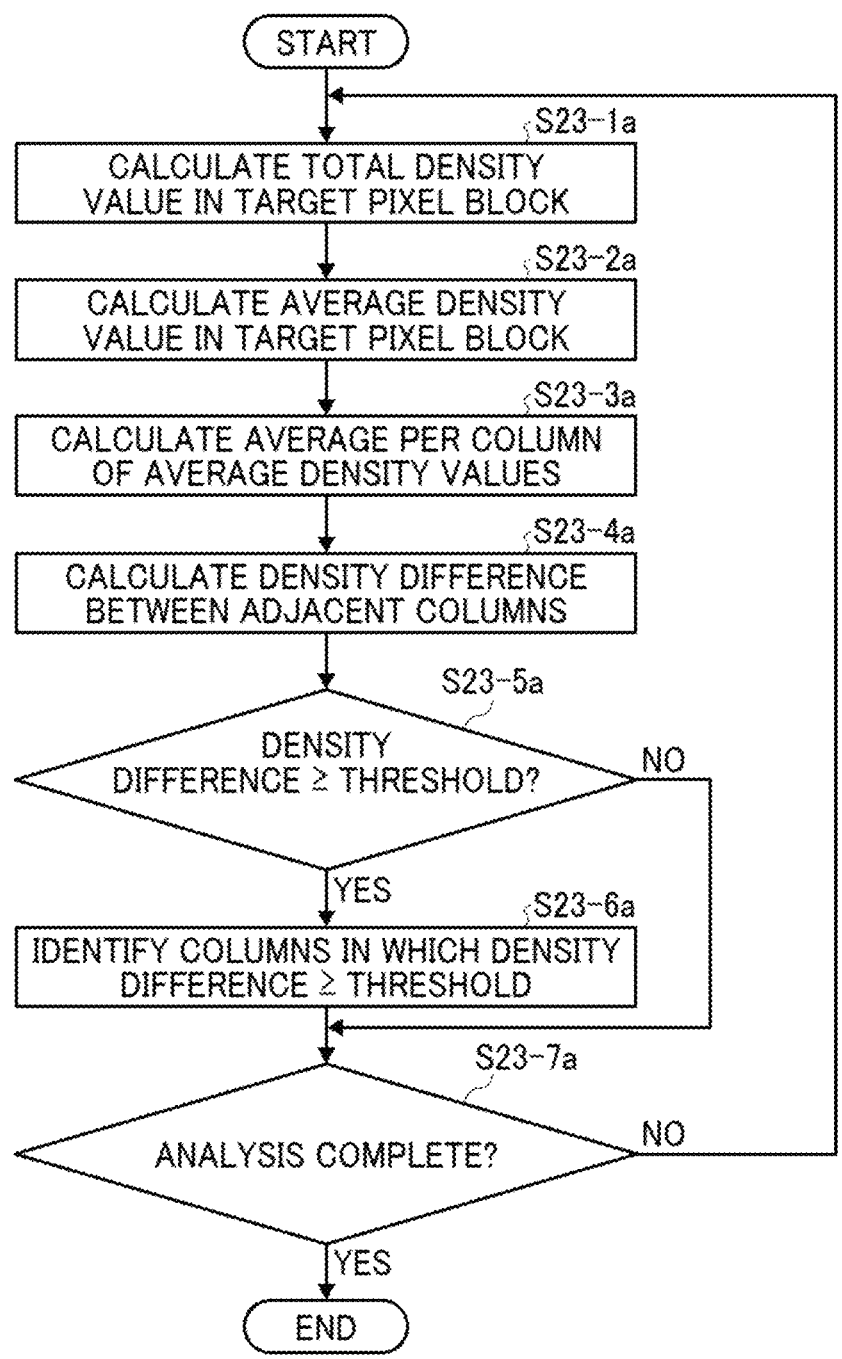
FIG. 15 is a flowchart illustrating an example of analysis process of the corrected density chart in the printing control apparatus according to Embodiment 1.

In S23, the analyzing unit 36 of the printing control apparatus 30 analyzes the gradation-density characteristics for each corrected density chart 80. For example, the corrected density chart 80 is printed for each of the head units 610. The analysis process of the gradation-density characteristics will be described in detail below with reference to FIGS. 15 and 16D. FIG. 15 is a flowchart illustrating an example of analysis process of the corrected density chart in the printing control apparatus according to Embodiment 1. FIG. 15 illustrates a process of analyzing the density data (luminance data, that is, 8-bit data from 0 to 255) divided for each grid of pixels, defined by the coordinates presented in FIG. 16A. FIG. 16B presents the density values at the pixels corresponding to the respective coordinates illustrated in FIG. 16A.

In S23-1*a*, the pixel-block processing unit 41 of the analyzing unit 36 calculates the total density value in a target pixel block, per unit pixel block. Specifically, when the unit pixel block is set to 2×2 pixels, as illustrated in FIG. 16C, the pixel-block processing unit 41 calculates the total density value of the densities in each 2×2 pixels (each 4 pixels). Although the unit pixel block setting is 2×2 pixels in the example described here, the unit pixel block can be set otherwise.

In S23-2a, the pixel-block processing unit 41 calculates, for each pixel block set as described above, an average value of the density values in the target pixel block. Specifically, as illustrated in FIG. 16D, the pixel-block processing unit 41 calculates the average value of the densities in the target pixel block regarding which the total density value has been calculated. For example, when the unit pixel block is 2×2 pixels (4 pixels), the pixel-block processing unit 41 divides the total density value with 4, which is the number of pixels of the target pixel block.

In S23-3a, the density difference detecting unit 42 of the analyzing unit 36 calculates, for each column of the set pixel blocks, an average of the respective average density values of the pixel blocks calculated in S23-2a. Specifically, the density difference detecting unit 42 calculates, for each pixel block column (in FIG. 16D, each of columns A to C), an average of the respective average density values of the column. The average of the average density values in each of columns A to C illustrated in FIG. 16D is presented in Table 1 below.

TABLE 1

| Column A | Column B | Column C |
|----------|----------|----------|
| 5.00     | 5.00     | 5.83     |

In S23-4a, the density difference detecting unit 42 calculates a density difference between adjacent columns. Specifically, the density difference detecting unit 42 calculates, for example, the density difference between the columns A and B and the density difference between the columns B and C in Table 1. In this case, the density difference between the columns A and B is 0, and the density difference between the columns B and C is 0.83.

In S23-5a, the density difference detecting unit 42 determines whether the calculated density difference is equal to or greater than the threshold. In response to a determination result that the calculated density difference is equal to or greater than the threshold (Yes in S23-5a), the process of the density difference detecting unit 42 proceeds to S23-6a. In S23-6a, the density difference detecting unit 42 identifies the column having the density difference equal to or greater than the threshold. The threshold is accepted by the accepting unit 52 of the printer 50 and used to detect the density difference set by the setting unit 35 of the printing control apparatus 30. For example, when the threshold is set to 0.8, the density difference detecting unit 42 detects the density difference between the columns B and C. The setting unit 35 can set the threshold for detecting the density difference for each chart (for each head unit), thereby setting the detection range of density difference for each chart. Whether the density difference is equal to or greater than the threshold is an example of a predetermined density condition. The column having the density difference equal to or greater than the threshold, that is, a pixel block satisfying the predetermined condition is an example of a second region.

By contrast, in response to a determination result that the calculated density difference is smaller than the threshold (No in S23-5a), the process of the density difference detecting unit 42 proceeds to S23-7a. In S23-7a, the density difference detecting unit 42 determines whether the analysis within the range regarding which the density adjustment is requested has completed. When the analysis has completed (Yes in S23-7a), the process ends. By contrast, when the analysis has not yet completed (No in S23-7a), the density difference detecting unit 42 repeats the process from S23-1a. The column having a density difference smaller than the threshold, that is, a pixel block not satisfying the predetermined condition is an example of a first region.

Although the density difference detecting unit 42 is configured to determine whether the calculated density difference is equal to or greater than a threshold in S23-5a in the example described above, the operation is not limited thereto. For example, the density difference detecting unit 42 can be configured to determine whether the calculated density difference is greater than a threshold. Further, when the threshold is, for example, a numerical range, the density difference detecting unit 42 can be configured to determine whether the calculated density difference is within the numerical range.

Referring back to FIG. 10, the description of the density adjustment in the print processing system 2 will be continued. In S24, the data generation unit 32 of the printing control apparatus 30 generates analysis data to output the analysis result by the analyzing unit 36. More specifically, in association with the pixel block in which the density difference has been detected by the density difference detecting unit 42, the data generation unit 32 adds a visual representation 91a to the read data of the corrected density chart 80 received in S21. The visual representation 91a is for identifying the pixel block from other pixel blocks. The analysis data generated by the data generation unit 32 includes the read data of the corrected density chart 80 illustrated in FIG. 14 and the visual representation 91a. Note that the analysis data does not necessarily include entire read data of the corrected density chart 80. The analysis data is sufficient when an image of the pixel block where the density difference is detected and an image of at least a portion of the pixel block where no density difference is detected are included therein to enable the user to visually confirm the uneven density.

In S25, the transceiver unit 31 of the printing control apparatus 30 transmits the analysis data generated by the data generation unit 32 to the printer 50. The transceiver unit 51 of the printer 50 receives the analysis data transmitted from the printing control apparatus 30.

Figure 17:
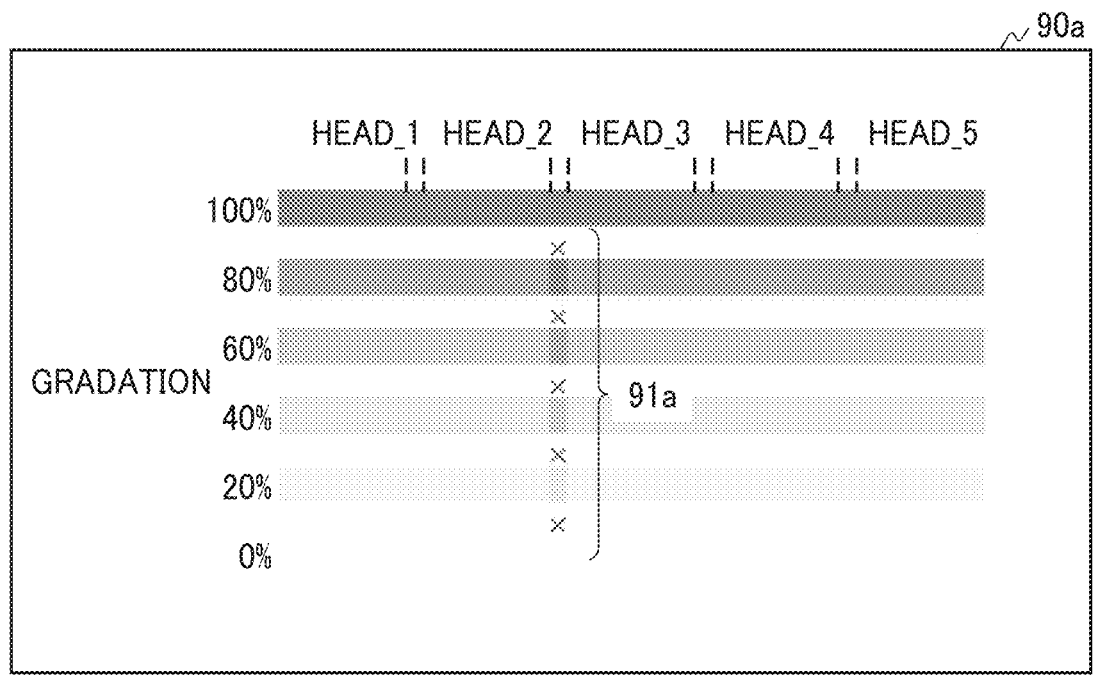
FIG. 17 is a diagram illustrating an example of an analysis chart printed in the printer according to Embodiment 1.

In S26, the printing control unit 54 of the printer 50 executes print process of the analysis data received by the transceiver unit 51 (an example of outputting). FIG. 17 is a diagram illustrating an example of an analysis chart printed by the printer according to Embodiment 1. An analysis chart 90a illustrated in FIG. 17 corresponds to the printing area (the liquid discharge area) same as the printing area of the corrected density chart 80 illustrated in FIG. 14. As the printing control unit 54 prints the analysis data received by the transceiver unit 51 on the recording medium, the analysis chart 90a as a printed matter is obtained.

The analysis chart 90a includes the visual representation 91a associated with the pixel block having the uneven density. The visual representation 91a (for example, marks "X" in FIG. 17) is added to the read image. Looking at the analysis chart 90a printed on the recording medium, the user can check the area indicated by the visual representation 91a, thereby grasping the area having the uneven density. The visual representation 91a is not limited to the example illustrated in FIG. 17 but can be any information to draw attention of the user to the corresponding area. The visual representation 91a can be other symbols such as a circle, a color coding, comments, and the like.

After the printing control unit 54 prints the analysis chart 90a, in S27, the display control unit 53 of the printer 50 causes the control panel 540 to display an evaluation result confirmation screen 750a for accepting feedback on the density adjustment result from the user. The evaluation result confirmation screen 750a illustrated in FIG. 18 is a screen for allowing the user who has checked the printed analysis chart 90a to input feedback, that is, whether the result of the density adjustment is acceptable.

Figure 18:
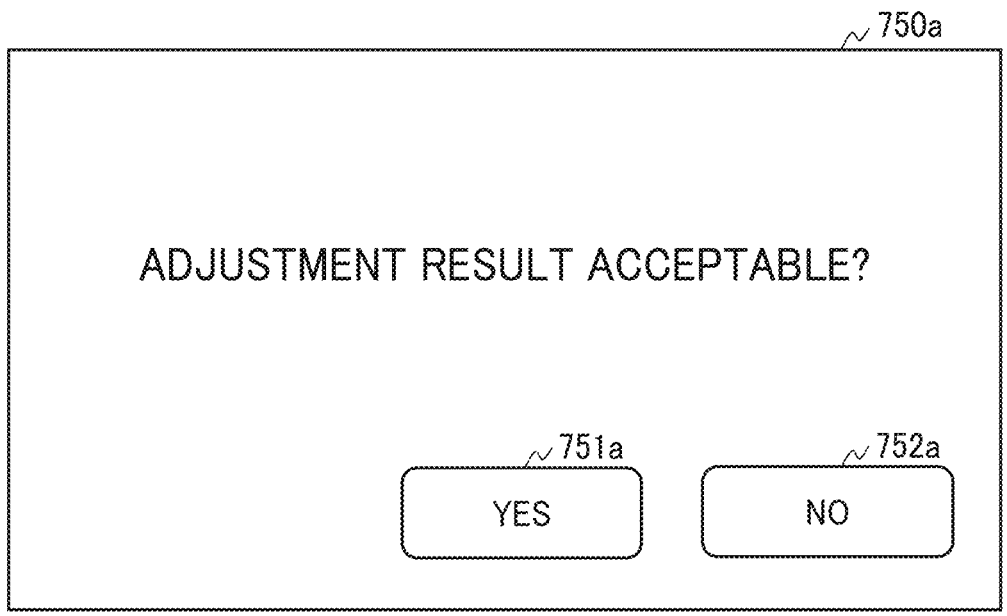
FIG. 18 is a diagram illustrating an example of an evaluation result confirmation screen displayed on the printer according to Embodiment 1.

As the accepting unit 52 of the printer 50 accepts selecting of a YES icon 751a on the evaluation result confirmation screen 750a illustrated in FIG. 18 (Yes in S28), the process proceeds to S29. In S29, the transceiver unit 51 of the printer 50 transmits a process completion notification to the printing control apparatus 30. The transceiver unit 31 of the printing control apparatus 30 receives the process completion notification transmitted from the printer 50.

In S30, in response to acceptance of the process completion notification by the transceiver unit 31, the storing and reading unit 37 of the printing control apparatus 30 stores the correction value calculated in S16 in the correction value management table 400.

By contrast, as the accepting unit 52 accepts pressing of a NO icon 752a on the evaluation result confirmation screen 750a illustrated in FIG. 18 (No in S28), the process proceeds to S12 to repeat the density adjustment.

As a result, the print processing system 2 presents, to the user, the analysis result of the corrected density chart 80 in which the density of the image to be formed on the recording medium is corrected by the printing control apparatus 30, thereby facilitating evaluation of image density by the user. In addition, the print processing system 2 can output the area where the density difference is detected by the analysis process by the printing control apparatus 30, in a form easy for the user to identify the area, to inform the user of the area to be carefully observed.

Figure 19A:
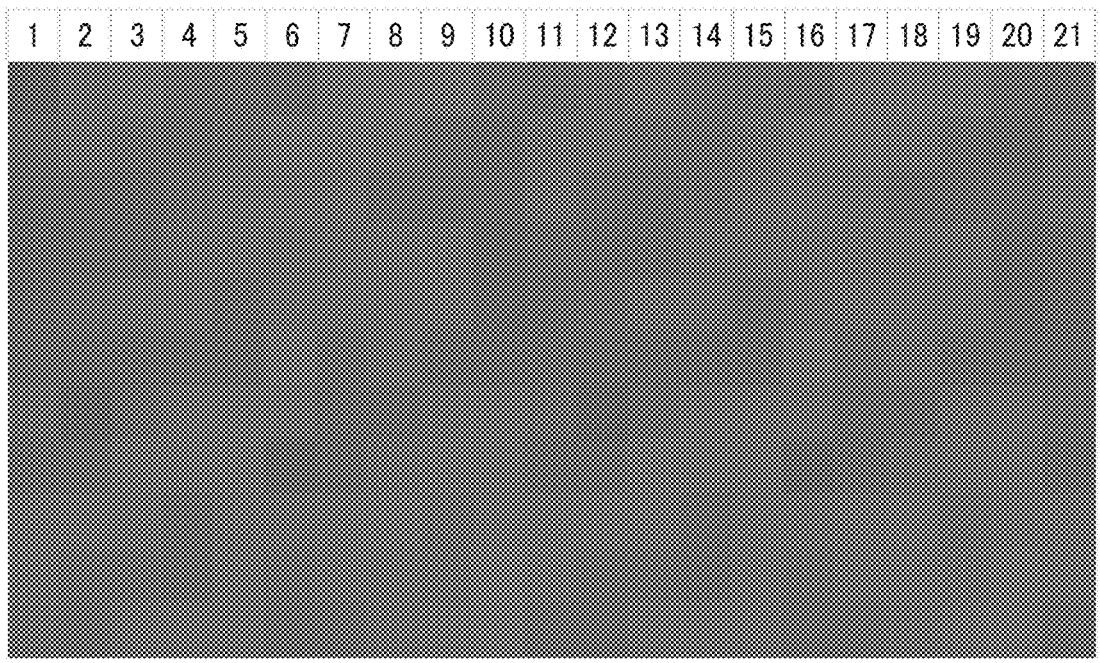
FIGS. 19A and 19B are diagrams illustrating an example of scan data in the print processing system according to Embodiment 1.
Figure 19B:
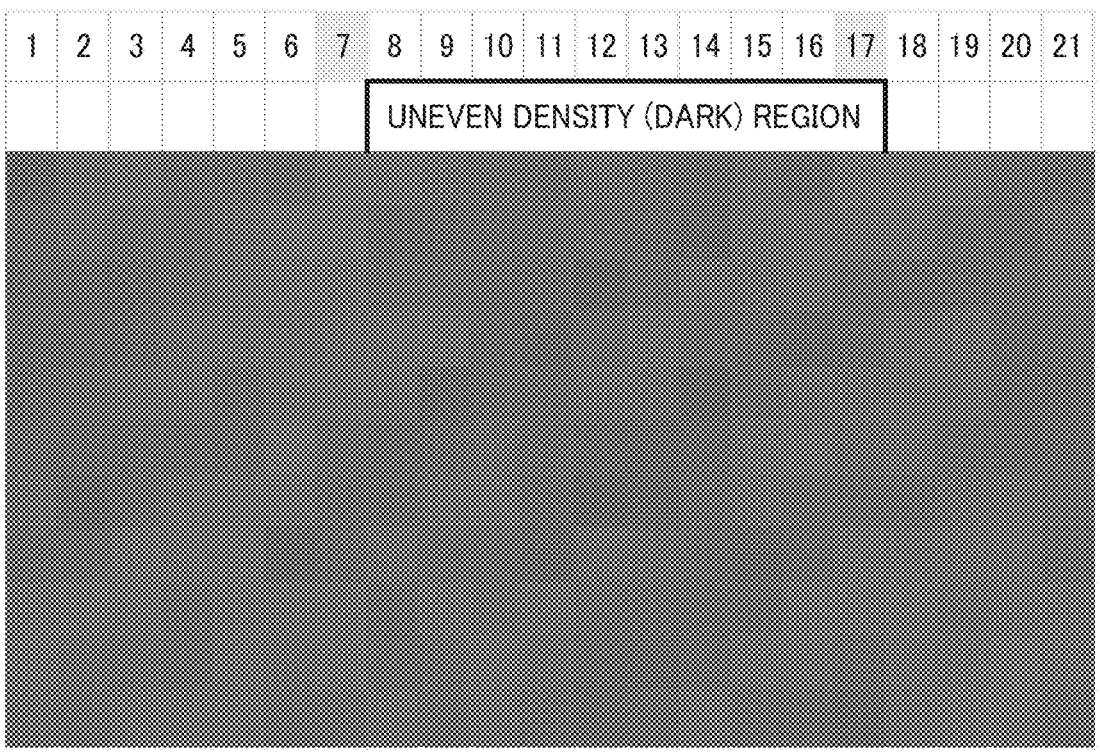
Figure 20:
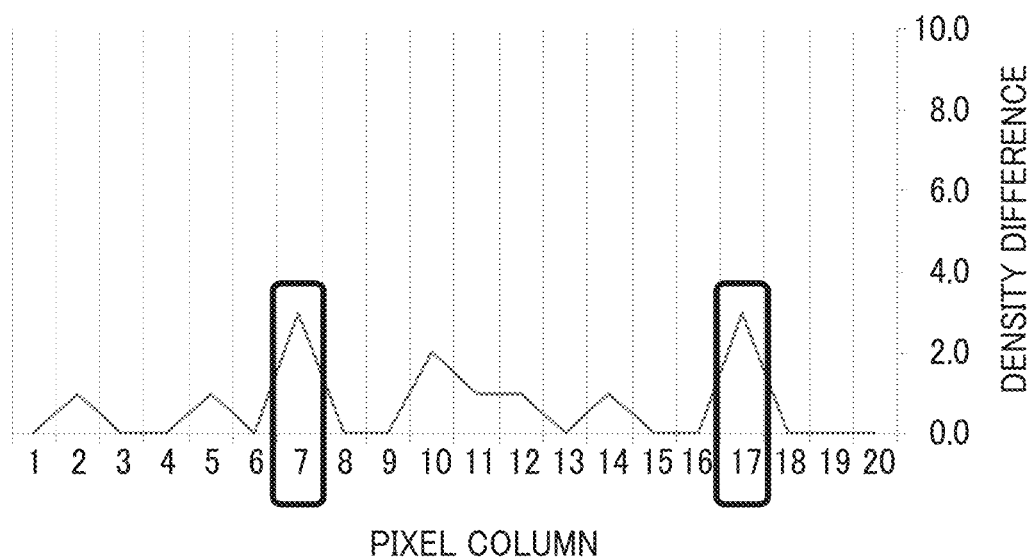
FIG. 20 is a chart illustrating an example of density distribution in a substandard image.

With reference to FIGS. 19A to 20, descriptions are given below of the analysis result by the analyzing unit 36 according to Embodiment 1, in comparison with scan data having ideal gradation-density characteristics. FIG. 19A illustrates an example of scan data having ideal gradation-density characteristics (a normal image), and FIG. 19B illustrates scan data having an uneven density portion (a substandard image). Compared with the ideal scan data illustrated in FIG. 19A, in the scan data illustrated in FIG. 19B, the density is uneven in a region extending from the seventh column to the seventeenth column. FIG. 20 is a graph illustrating the distribution of density per pixel column in the scan data (substandard image) illustrated in FIG. 19B. For example, when the setting unit 35 sets the threshold to "3", the density difference detecting unit 42 of the analyzing unit 36 detects uneven density in the seventh column and the seventeenth column illustrated in FIG. 20.

Figure 21:
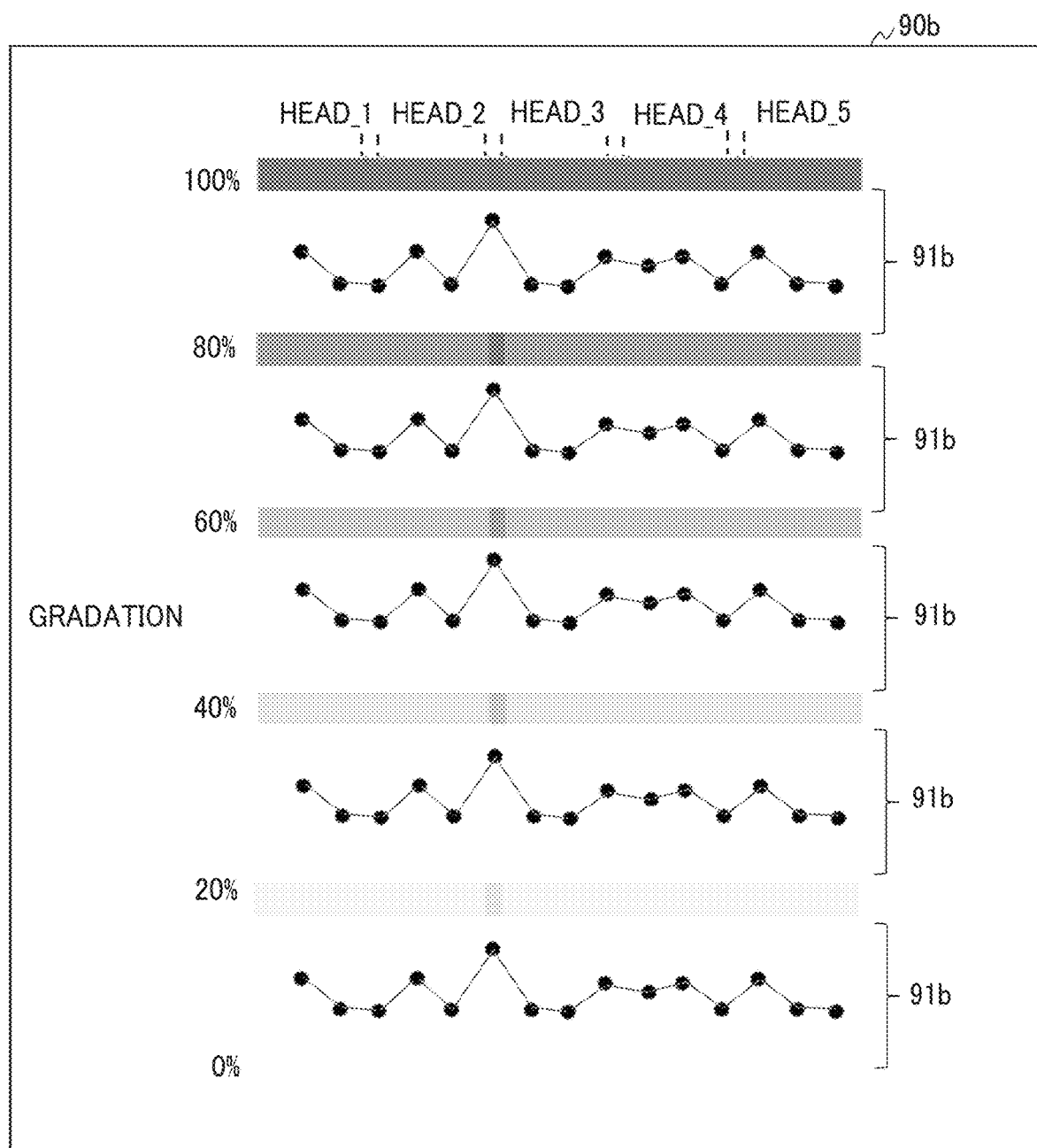
FIG. 21 is a diagram illustrating a modified example of the printed analysis chart in the printer according to Embodiment 1.

In addition, the analysis chart 90a can be configured to indicate density characteristics representing the densities calculated by the density calculation unit 33, instead of the visual representation. FIG. 21 illustrates a modification of the analysis chart printed by the printer according to Embodiment 1. An analysis chart 90b illustrated in FIG. 21 includes visual representations 91b representing the density distribution in an image included in the analysis chart 90b, instead of the visual representations 91a included in the analysis chart 90a illustrated in FIG. 17. With the analysis chart 90b thus configured, the print processing system 2 can present, to the user, the density characteristics of the entire image as well as the region where the density is uneven.

Further, the print processing system 2 can output the analysis chart 90a or the analysis chart 90b (hereinafter, referred to as "analysis chart 90" when discrimination is not required) in the form of displaying instead of printing. In this case, the display control unit 53 of the printer 50 can display the analysis chart 90 on the control panel 540, so that the user can immediately check the content of the analysis chart 90.

Figure 22:
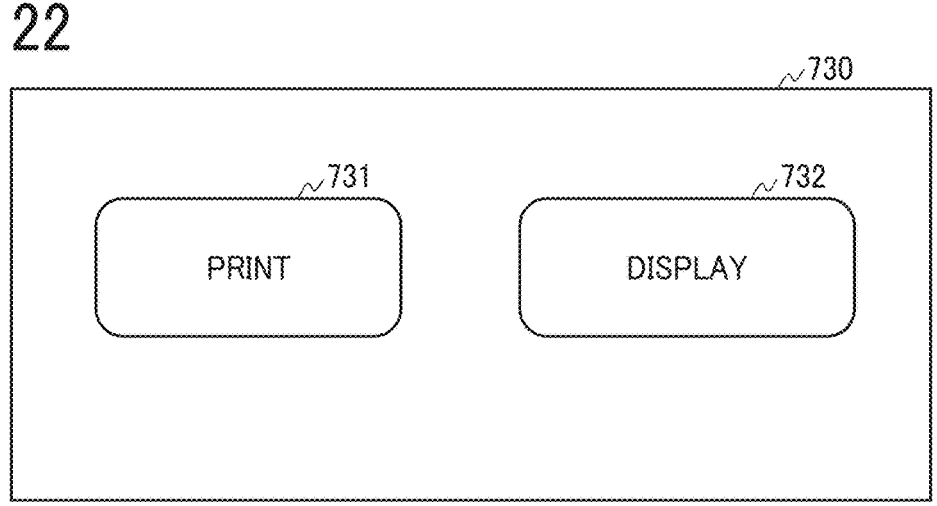
FIG. 22 is a diagram illustrating a modified example of the operation screen displayed on the printer according to Embodiment 1.

Further, the print processing system 2 can be configured to allow output method options of the analysis chart 90. FIG. 22 illustrates a modification of the operation screen displayed on the printer according to Embodiment 1. An operation screen 730 illustrated in FIG. 22 includes selection icons 731 and 732 for selecting the output method of the analysis chart 90. The selection icon 731 is to be selected to print the analysis chart 90a. The selection icon 732 is to be selected to display the analysis chart 90a. The user can check the analysis chart 90 output in a desired output method selected on the operation screen 730.

As described above, in the print processing system 2 according to Embodiment 1, the printer 50 includes the reading control unit 55 to read an image on a recording medium to generate a read data, and the density calculation unit 33 to calculate the density per unit pixel block of the read image based on the read data. Further, when the read image includes a pixel block having a density difference equal to or greater than the threshold (or greater than the threshold) from the density of other pixel blocks, the print processing system 2 outputs the visual representation 91a, in association with that pixel block, for discriminating that pixel block from other pixel blocks. As a result, the print processing system 2 can clearly notify the user of the area having the density difference in the image formed on the recording medium. Accordingly, the efficiency of checking by the user of the density of the image can improve.

Modification of Embodiment 1

Figure 23:
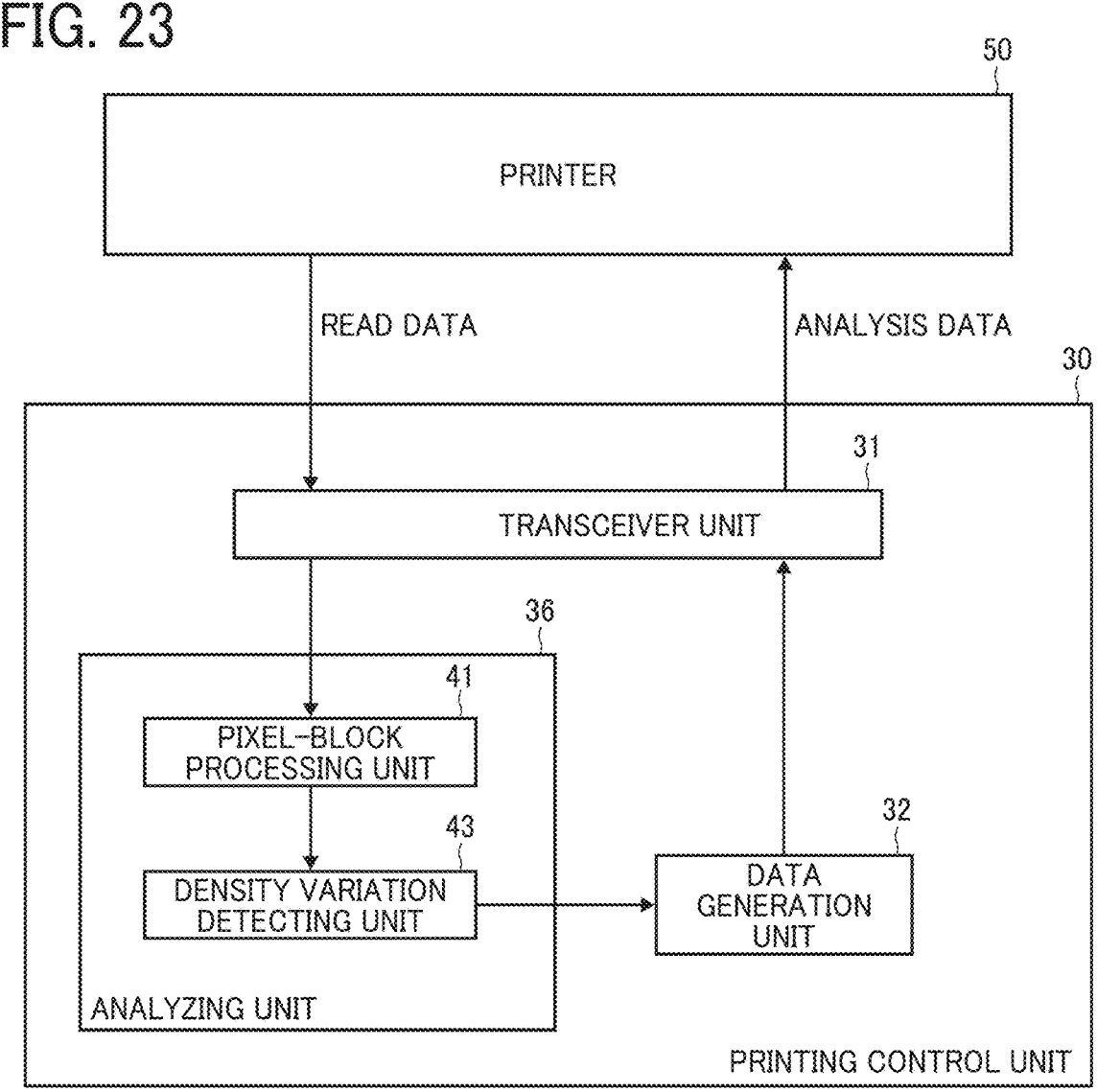
FIG. 23 is a block diagram illustrating an example of a detailed configuration of an analyzing unit of a printing control apparatus according to a modification of Embodiment 1.

Next, descriptions are given below of a printing system according to a modification of Embodiment 1. According to the modification of Embodiment 1, the analyzing unit 36 of the printing control apparatus 30 performs the analysis and evaluation of the image density based on not the density difference among the pixels but density variations (dispersion) in the entire image. FIG. 23 is a block diagram illustrating an example of a detailed configuration of an analyzing unit of the printing control apparatus according to the modification of Embodiment 1. In the modification of Embodiment 1, the analyzing unit 36 includes a density variation detecting unit 43 instead of the density difference detecting unit 42. The density variation detecting unit 43 functions to detect variations in image density in the read data received by the transceiver unit 31.

Figure 24:
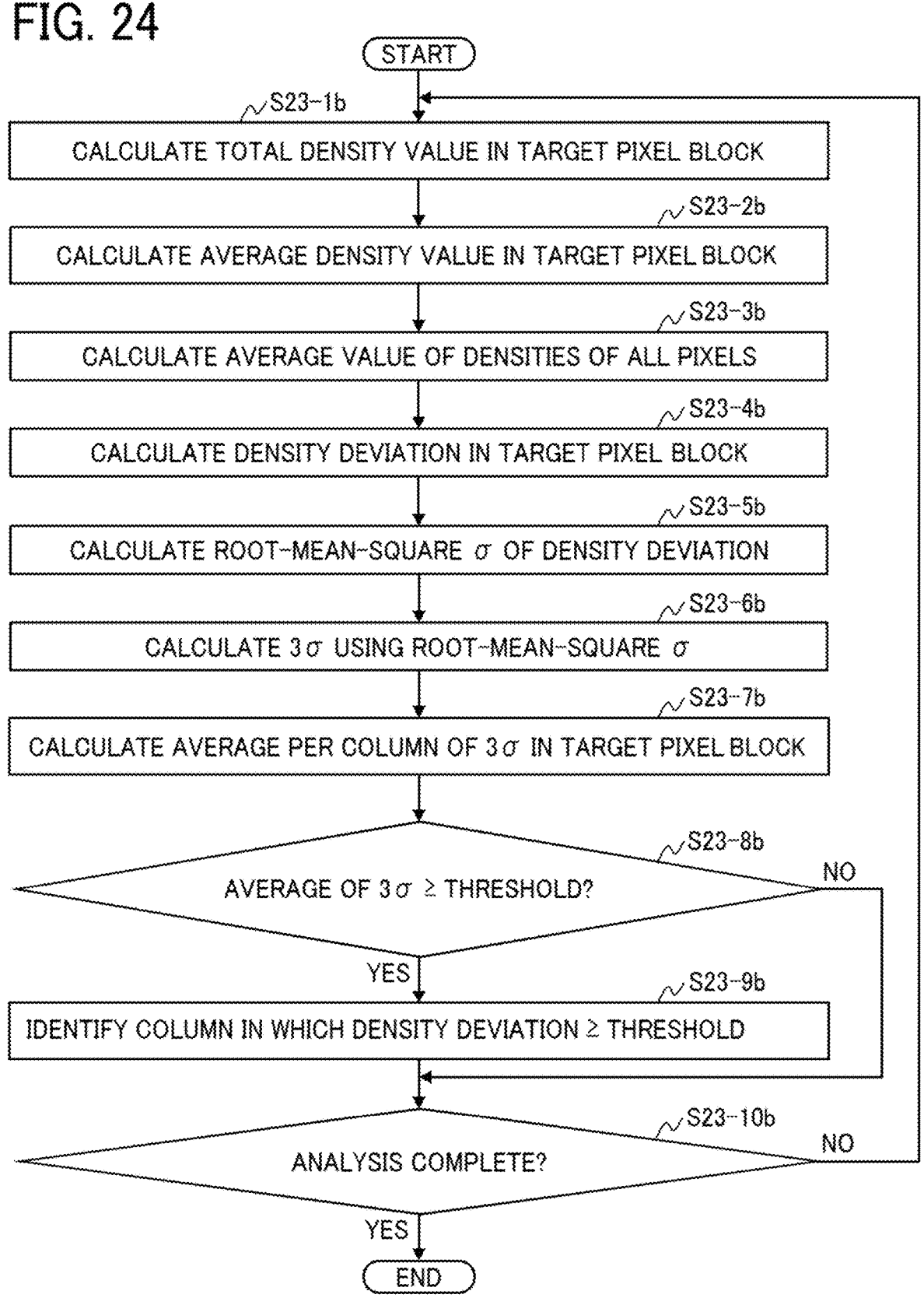
FIG. 24 is a flowchart illustrating an example of analysis process of the corrected density chart in the printing control apparatus according to a modification of Embodiment 1.

Next, with reference to FIG. 24 and FIG. 25, analysis process of the corrected density chart 80 according to the modification of Embodiment 1 will be described. FIG. 24 is a flowchart illustrating an example of analysis process of the corrected density chart in the printing control apparatus according to the modification of Embodiment 1. Since the processes in S23-1b and S23-2b are similar to those in S23-1a and S23-2a illustrated in FIG. 15, the description thereof will be omitted.

In S23-3b, the pixel-block processing unit 41 of the analyzing unit 36 calculates the average of density values of all pixels in the image according to the read data. Specifically, the pixel-block processing unit 41 calculates the average of density values of all pixels illustrated in FIG.

16D. In the example illustrated in FIG. 16D, the average of density values of all pixels (hereinafter "all-pixel average") is 5.277. In the description below, the third decimal point thereof is dropped.

In S23-4b, the density variation detecting unit 43 of the analyzing unit 36 calculates a deviation of density value in the target pixel block, for each unit pixel block. Specifically, first, the density variation detecting unit 43 calculates the average between the density value of the target pixel block (i.e., the average density calculated in S23-2b) and the all-pixel average (5.27), for each unit pixel block. Next, the density variation detecting unit 43 calculates the deviation of the density in the target pixel block based on the difference between the calculated average value and the density value of the target pixel block. For example, the average value between the upper left block in FIG. 16D and the all-pixel average is calculated as "(5+5.27)/2=5.1385", and the deviation in the upper left block is calculated as "5.1385−5=0.1385". Further, for example, the average value between the lower right block in FIG. 16D and the all-pixel average is calculated as "(6.25+5.27)/2=5.7635". The deviation in the lower right block is calculated as "5.7635−6.25=−0.4865".

In S23-5b, the density variation detecting unit 43 calculates a root-mean-square $\sigma$ of the deviation of the density calculated for unit pixel block. For example, the root-mean-square in the upper left block in FIG. 16D is calculated as "$(0.1385)^2=0.0192$". Similarly, the root-mean-square in the lower right block in FIG. 16D is calculated as "$(-0.4865)^2=0.2366$".

In S23-6b, the density variation detecting unit 43 calculates $3\sigma$ using the calculated root-mean-square $\sigma$. FIG. 25 presents the $3\sigma$ values calculated for each unit pixel block.

In S23-7b, the density variation detecting unit 43 calculates an average in each column of the $3\sigma$ values calculated for each column of the pixel blocks. Specifically, the density variation detecting unit 43 calculates an average value of the $3\sigma$ values in each of columns A to C in FIG. 25. The average values per column calculated using the example illustrated in FIG. 25 are presented in Table 2 below.

TABLE 2

| Column A | Column B | Column C |
|---|---|---|
| 0.06 | 0.06 | 0.49 |

In S23-8b, the density variation detecting unit 43 determines whether there is a column having the average $3\sigma$ value equal to or greater than the threshold (or there is an average $3\sigma$ value equal to or greater than the threshold). When there is the column having the calculated average $3\sigma$ value equal to or greater than the threshold, the process of the density variation detecting unit 43 proceeds to S23-9b. In S23-9b, the density variation detecting unit 43 identifies the column having the detected density variation equal to or greater than the threshold. The threshold here is accepted by the accepting unit 52 of the printer 50 and used to detect the density variation set by the setting unit 35 of the printing control apparatus 30. For example, when the threshold is set to 0.45, the density variation detecting unit 43 detects density variations in C column. As the $3\sigma$ value becomes larger, the density variation increases. The setting unit 35 can set the threshold for detecting the density variation for each chart (for each head unit), thereby setting an allowable range of density variation for each chart. The threshold for detecting the density variation is an example of the predetermined condition. Whether the density variation is equal to or greater than the threshold is an example of the predetermined density condition. The pixel block having the density variation equal to or greater than the threshold, that is, the pixel block satisfying the predetermined condition is an example of the second region.

By contrast, in S23-8b, when the calculated average $3\sigma$ values are smaller than the threshold, the process of the density variation detecting unit 43 proceeds to S23-10b. In S23-10b, the density variation detecting unit 43 determines whether the analysis within the range regarding which the density adjustment is requested has completed. When the analysis has completed (Yes in S23-10ba), the process ends. By contrast, when the analysis has not yet completed (No in S23-10b), the density variation detecting unit 43 repeats the process from S23-1b. The pixel column having the density variation smaller than the threshold, that is, a pixel block not satisfying the predetermined condition is an example of the first region.

Figure 26A:
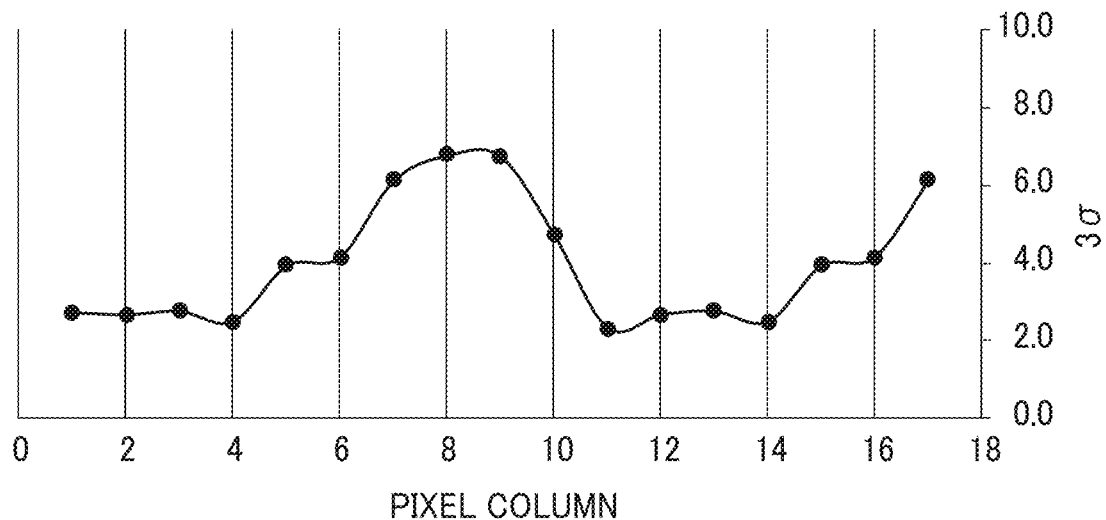
FIG. 26A is a graph illustrating an example of density distribution of a normal image.
Figure 26B:
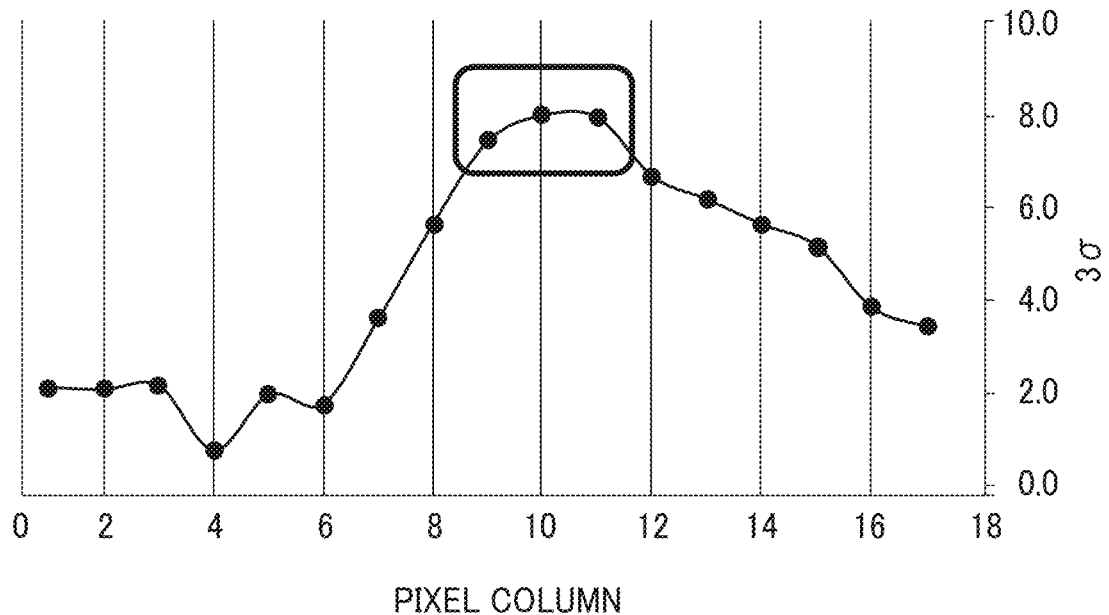
FIG. 26B is a graph illustrating an example of density distribution of a substandard image.

Referring to FIG. 26, descriptions are given below of the analysis result by the analyzing unit 36 according to the modification of Embodiment 1, in comparison with scan data having ideal gradation-density characteristics. FIG. 26A illustrates an example of density variations in scan data (a normal image) having ideal gradation-density characteristics, and FIG. 26B illustrates an example of density variations in scan data (a substandard image) having an uneven density portion. In FIGS. 26A and 26B, numerical values on the horizontal axis represents pixel blocks each including five pixels, and the vertical axis represents average dispersion values ($3\sigma$) of the corresponding five pixels. The density variation per pixel block is greater in the density characteristics illustrated in FIG. 26B, compared with the ideal scan data illustrated in FIG. 26A. For example, when the setting unit 35 sets the threshold to "7.0", the density variation detecting unit 43 of the analyzing unit 36 detects uneven density in the ninth to eleventh columns.

As described above, according to the modification of Embodiment 1, the print processing system 2 can clearly notify the user of the pixel block having the density variation in the image formed on the recording medium. Accordingly, the efficiency of checking by the user of the density of the image can improve.

Next, descriptions are given below of a printing system according to Embodiment 2. Note that elements similar to those of Embodiment 1 are given identical or similar reference characters, and redundant descriptions are omitted. In the print processing system 2 according to Embodiment 2, the image density analysis process by the analyzing unit 36 is applicable to not only the corrected density chart 80 but also a chart before the image density correction (for example, the adjustment chart 70).

Figure 27:
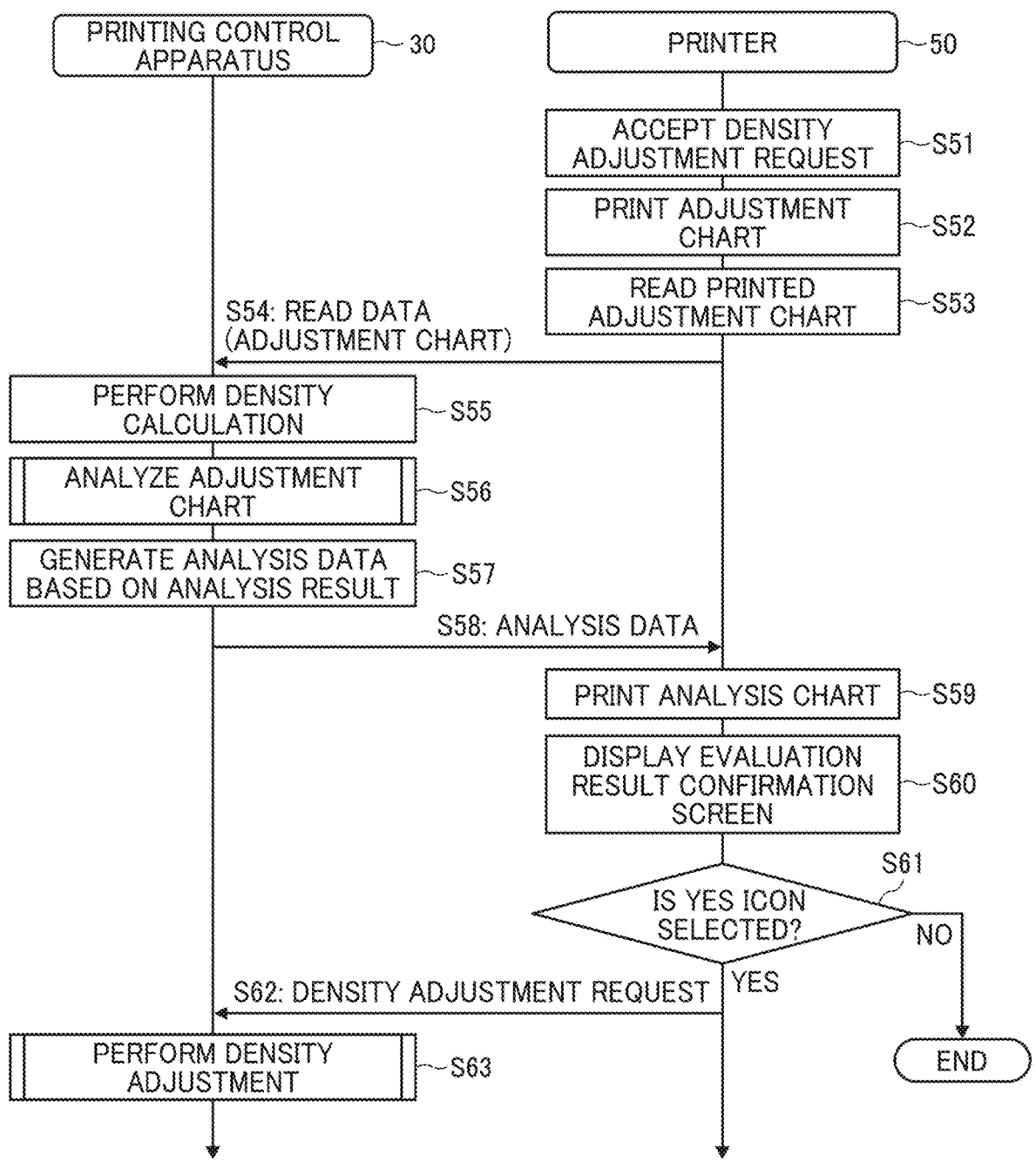
FIG. 27 is a sequence chart illustrating an example of density adjustment according to Embodiment 2.

FIG. 27 is a sequence chart illustrating an example of density adjustment in the print processing system according to Embodiment 2. In S51, the accepting unit 52 of the printer 50 accepts an input of a density adjustment request from the user. Specifically, on the operation screen 700 (see FIGS. 11A and 11B) displayed on the control panel 540 by the display control unit 53, the user selects the selection icon 702 and the OK icon 716. The accepting unit 52 accepts inputs to the selection icon 702 and the OK icon 716 on the operation screen 700 displayed on the control panel 540.

In S52, in response to an acceptance of the density adjustment request by the accepting unit 52, the printing control unit 54 of the printer 50 performs, with the printing unit 520, the printing process of an adjustment chart 70 used for the density adjustment. The printer 50 stores in advance the printing parameters for printing the adjustment chart 70 in the storage unit 5000. The printing control unit 54 reads the printing parameters from the storage unit 5000 via the storing and reading unit 56, to execute the printing process of the adjustment chart 70. In S53, the reading control unit 55 of the printer 50 causes the scanner unit 530 to read the printed adjustment chart 70 (an example of reading). The printing process by the printing control unit 54 and the reading process by the reading control unit 55 are executed as a series of operations.

In S54, the transceiver unit 51 of the printer 50 transmits the read data of the adjustment chart 70, read by the reading control unit 55, to the printing control apparatus 30. The transceiver unit 31 of the printing control apparatus 30 receives the read data transmitted from the printer 50.

In S55, the density calculation unit 33 of the printing control apparatus 30 calculates the image density of the adjustment chart 70 based on the read data received by the transceiver unit 51 (an example of calculating). Since the process by the density calculation unit 33 is the same as the process in S15 in FIG. 10, redundant descriptions are omitted.

In S56, the analyzing unit 36 of the printing control apparatus 30 analyzes the gradation-density characteristics of the adjustment chart 70 based on the image density calculated by the density calculation unit 33. Since the process by the analyzing unit 36 is the same as the process presented in FIG. 15, redundant descriptions are omitted.

In S57, the data generation unit 32 of the printing control apparatus 30 generates analysis data to output the analysis result generated by the analyzing unit 36. Specifically, the data generation unit 32 adds, to the analysis data, a visual representation in association with the pixel block in which the density difference is detected by the density difference detecting unit 42.

In S58, the transceiver unit 31 of the printing control apparatus 30 transmits the analysis data, generated by the data generation unit 32, to the printer 50. The transceiver unit 51 of the printer 50 receives the analysis data transmitted from the printing control apparatus 30.

In S59, the printing control unit 54 of the printer 50 executes print process of the analysis data received by the transceiver unit 51 (an example of outputting). After the printing control unit 54 prints the analysis chart 90, in S60, the display control unit 53 of the printer 50 causes the control panel 540 to display an evaluation result confirmation screen 750*b* for accepting an input from the user regarding whether or not to perform density adjustment. The evaluation result confirmation screen 750*b* illustrated in FIG. 28 is a screen for allowing the user who has checked the printed analysis chart 90 to input whether or not to perform the density adjustment.

Figure 28:
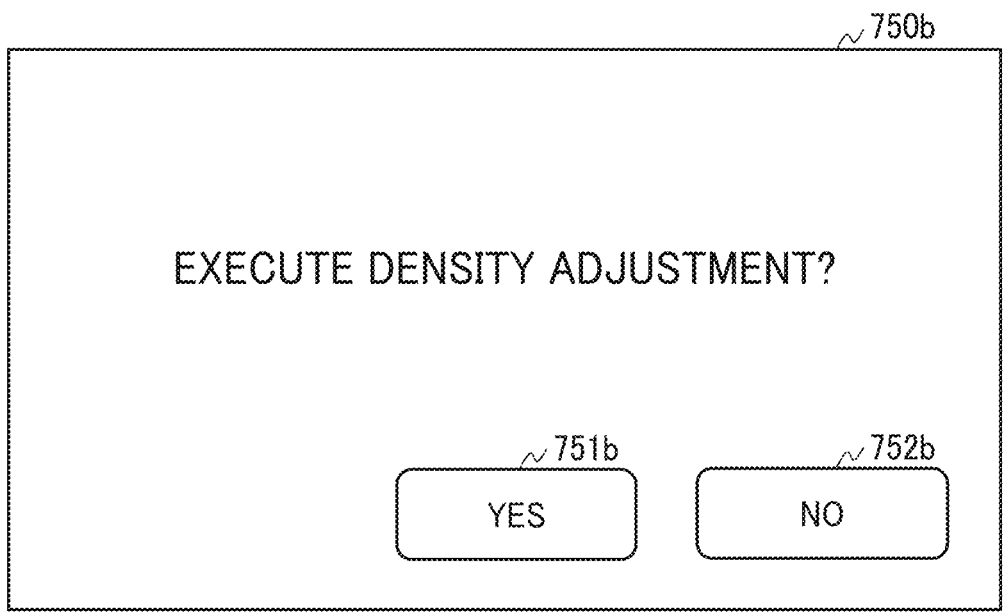
FIG. 28 is a diagram illustrating an example of an evaluation result confirmation screen displayed on a printer according to Embodiment 2.

As the accepting unit 52 of the printer 50 accepts selecting of a YES icon 751*b* on the evaluation result confirmation screen 750*b* illustrated in FIG. 28 (Yes in S61), the process proceeds to S62. In S62, the transceiver unit 51 of the printer 50 transmits a density adjustment request to the printing control apparatus 30. The density adjustment request can include information of the chart (the head unit 610) regarding which the density adjustment process selected by the user is requested. Then, the transceiver unit 31 of the printing control apparatus 30 receives the density adjustment request transmitted from the printer 50.

In response to a receipt of the density adjustment request, in S63, the printing control apparatus 30 performs density adjustment using the read data of the adjustment chart 70 received in S54. The density adjustment in this case is the same as the process starting in S15 illustrated in FIG. 10, and thus redundant descriptions are omitted. When the density adjustment request includes the information on the chart (the head unit 610) regarding which the density adjustment is requested, the printing control apparatus 30 can be configured to perform the density adjustment for the chart (the head unit 610) that is the subject for density adjustment.

By contrast, in S61, as the accepting unit 52 of the printer 50 accepts selecting of a NO icon 752*b* on the evaluation result confirmation screen 750*b* illustrated in FIG. 28, the density adjustment is not required. Then, the process ends.

As described above, in the print processing system 2 according to Embodiment 2, the analyzing unit 36 is configured to analyze the chart (for example, the adjustment chart 70) before the image density correction. Accordingly, the print processing system 2 allows the user who is visually checking the analysis result to determine whether or not to adjust the image density. Thus, according to Embodiment 2, the print processing system 2 can be configured not to perform the density adjustment when the user who is visually checking the printed analysis chart 90 (a printed matter) determines that density adjustment is not required. Accordingly, the time and processing load for the density adjustment can be reduced.

As described above, according to an aspect of the present disclosure, an image forming system (for example, the print processing system 2) includes a reading device (for example, the scanner unit 530) configured to read an image formed on a recording medium by an image forming apparatus (for example, the printer 50), a reading unit (for example, the reading control unit 55) to control the reading device, a calculation unit (for example, the density calculation unit 33) to calculate a density of the read image for each predetermined area (for example, unit pixel block), and an output unit (for example, the display control unit 53 or the printing control unit 54). When the read image includes a second region satisfying a predetermined density condition (for example, the density difference or density variation is not smaller than a threshold), the output unit outputs an image of a first region (for example, the column A in FIG. 25) not satisfying the predetermined density condition, an image of the second region (for example, the column C in FIG. 25) satisfying the predetermined density condition, and a visual representation (for example, the visual representation 91*a* or 91*b*) associated with the second region. With this configuration, the print processing system 2 can clearly notify the user of an uneven density area in the image formed on the recording medium, thereby improving the efficiency in image density checking by the user.

According to another aspect of the present disclosure, in the image forming system (for example, the print processing system 2), the predetermined density condition relates to a density difference. The output unit (for example, the display control unit 53 or the printing control unit 54) is configured to output the visual representation (for example, the visual representation 91*a* or 91*b*) associated with the second region (for example, the pixel block) when there is a pixel block having a density difference not smaller than the threshold relative to other regions. Thus, with the visual representation 91*a*, the print processing system 2 can facilitate distinguishing, by the user, of a region having a large density difference from the densities in other regions of the image formed on the recording medium, thereby improving checking of the image density by the user.

According to another aspect of the present disclosure, in the image forming system (for example, the print processing system 2), the predetermined density condition relates to a density variation. The output unit (for example, the display control unit 53 or the printing control unit 54) is configured to output the visual representation (for example, the visual representation 91*a*) associated with the second region (for example, the column C) when the read image includes a region having a density variation not smaller than the threshold. Thus, with the visual representation 91*b*, the print processing system 2 can facilitate distinguishing, by the user, of a region having a large density variation from other regions of the image formed on the recording medium, thereby improving checking of the image density by the user.

According to another aspect of the present disclosure, in the image forming system (for example, the print processing system 2), the visual representation 91*b* is information on the density distribution in the read image read by the reading control unit 55. With this configuration, the print processing system 2 helps the user to check the density characteristics of the entire image as well as the region having the density difference or the density variation, in the image formed on the recording medium.

According to another aspect of the present disclosure, the image forming system (for example, the print processing system 2) includes the correction unit (for example, the correction value calculation unit 34) configured to correct the density of an image formed by the image forming apparatus (for example, the printer 50). The reading unit (for example, the reading control unit 55) is configured to read a corrected image (for example, the corrected density chart 80) in which the density has been corrected. The calculation unit (for example, the density calculation unit 33) is configured to calculate the density of the read image (for example, the corrected density chart 80) for each predetermined area (for example, each pixel block). Thus, the print processing system 2 can present, to the user, the analysis result of the corrected density chart 80 in which image density has been corrected, thereby improving the efficiency of checking of the image density by the user.

According to another aspect of the present disclosure, the image forming system (for example, the print processing system 2) includes the accepting unit (for example, the accepting unit 52) configured to accept selecting of output method of the visual representation (for example, the visual representation 91*a*) from printing and displaying. In response to the selecting, the output unit (for example, the display control unit 53 or the printing control unit 54) outputs the visual representation (for example, the visual representation 91*a*) in the selectee output method. Accordingly, the print processing system 2 can provide the user with the analysis result generated by the printing control apparatus 30 in the form convenient for the user to check the analysis result.

Further, an embodiment of the present disclosure concerns a density adjusting method executed by the image forming system (for example, the print processing system 2). The density adjusting method includes reading an image formed on a recording medium by an image forming apparatus (for example, the printer 50); calculating a density of the read image for each predetermined unit area (for example, unit pixel block); determining whether the read image includes a second region satisfying a predetermined density condition; and, in response to a determination that the read image includes the second region, outputting an image of a first region (for example, the column A) not satisfying the predetermined density condition, an image of the second region (for example, the column C) satisfying the predetermined density condition, and a visual representation (for example, the visual representation 91*a*) associated with the second region. As a result, the print processing system 2 can clearly notify the user of the area having the density difference in the image formed on the recording medium. Accordingly, the efficiency of checking by the user of the density of the image can improve.

Further, another embodiment of the present disclosure concerns a printed matter on which an image is formed by an image forming apparatus (for example, the printer 50). The printed matter includes a visual representation (the visual representation 91*a*) associated with an uneven density region of the image as discrimination of the uneven density region from another region of the image. Thus, the printed matter according to an aspect of the present disclosure helps, with the visual representation, the user to distinguish the uneven density region of the printed image, thereby improving the efficiency in checking the image density by the user.

In each embodiment of the present disclosure, the recording medium (an object) to bear a printed image is not limited to paper sheets, as long as a liquid can adhere thereto at least temporarily. The recording medium to bear an image is a material to which a liquid adheres and fastens thereto, or a material to which a liquid adheres and permeates. The recording medium is, for example, a medium such as recording paper, a recording sheet, film, or cloth; an electronic component such as an electronic substrate or a piezoelectric element; or a medium such as a powder layer (a granular material layer), an organ model, or an inspection cell. That is, the recording medium can be anything to which the liquid res. The material of the recording medium can be any material, such as paper, thread, fiber, cloth, leather, metal, plastic, glass, wood, ceramics, or the like, as long as liquid can re at least temporarily.

In each embodiment of the present disclosure, the liquid discharged from the liquid discharge heads 69 is not limited as long as the liquid has a viscosity and a surface tension to allow the liquid to be discharged from the liquid discharge heads 69. The liquid to be applied is not particularly limited but preferably has a viscosity of 30 mPa·s or lower under ordinary temperature and ordinary pressure or by heating and cooling. Specifically, the liquid is, for example, a solution, a suspension, or an emulsion including a solvent, such as water or organic solvent, a colorant, such as a dye or a pigment, a polymerizable compound, a resin, a functional material, such as a surfactant, a biocompatible material, such as deoxyribonucleic acid (DNA), amino acid, protein, or calcium, or an edible material, such as a natural colorant. Such a solution, a suspension, or an emulsion can be used for, e.g., inkjet ink, a surface treatment liquid, liquid for forming components of electronic elements or light-emitting elements, liquid for forming resist patterns of electronic circuits, or a material solution for three-dimensional fabrication. Further, in each embodiment of the present disclosure, the liquid discharge heads 69 includes a device to discharge a liquid, a device to jet a liquid, a device to apply a liquid to a medium, and the like.

The functions of the embodiments of the present disclosure can be implemented by a computer executable program described in a legacy programming language such as an assembler, C, C++, C#, and Java (registered trademark), or an object-oriented programming language, and the program to implement the functions in each embodiment can be distributed via a telecommunication line.

The program for executing the functions of the embodiments of the present invention can be stored, for distribution, on a readable recording medium such as a ROM, an electrically erasable programmable read-only memory (EE- PROM), an erasable programmable read-only memory (EPROM), a flash memory, a flexible disk (FD), a CD-ROM, a DVD-ROM, a DVD-RAM, a DVD-Rewritable (DVD-RW), a Blu-ray disc, a secure digital (SD) card, a magneto-optical disc (MO), and etc.

Furthermore, some or all of the functions of the embodiments of the present disclosure can be implemented on a programmable device (PD) such as a field programmable gate array (FPGA) or can be implemented as an ASIC. That is, the functions can be, stored on a recording medium for distribution, as data written in circuit configuration data (bit stream data) to be downloaded on the PD to implement the functions of the embodiments thereon, hardware description language (HDL) for generating circuit configuration data, very high speed IC hardware description language (VHDL), Verilog hardware description language (Verilog-HDL), or the like.

Although the image forming system, the density adjusting method, the program, and the printed matter are described above as embodiments of the present disclosure, the present disclosure is not limited thereto. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image forming system comprising:
   an image forming device configured to form an image on a recording medium;
   a reading device configured to read the image formed on the recording medium by the image forming device; and
   circuitry configured to:
      control the reading device;
      calculate a density of each predetermined unit area of the read image;
      determine whether the read image includes a region satisfying a predetermined density condition based on the calculated density; and
      output an image of a first region of the read image not satisfying the predetermined density condition, an image of a second region satisfying the predetermined density condition, and a visual representation associated with the second region in response to a determination that the read image includes the second region.

2. The image forming system according to claim 1, wherein the predetermined density condition relates to a density difference of the second region relative to a density of the first region, and
   wherein the second region is a region of the image having a density difference equal to or greater than a threshold.

3. The image forming system according to claim 1, wherein the predetermined density condition relates to a density variation in the read image, and
   wherein the second region is a region of the image having a density variation equal to or greater than a threshold.

4. The image forming system according to claim 1, wherein the visual representation is information added to the read image as discrimination of the image of the second region from the image of the first region.

5. The image forming system according to claim 1, wherein the visual representation represents information on a density distribution of the read image.

6. The image forming system according to claim 1, wherein the predetermined unit area of the image is a block of a predetermined number of pixels of the read image.

7. The image forming system according to claim 1, wherein the circuitry is configured to:
   correct the density of the image formed by the image forming device;
   cause the image forming device to print a corrected image in which the density is corrected;
   cause the reading device to read the corrected image; and
   calculate a density of each predetermined unit area of the corrected image.

8. The image forming system according to claim 1, wherein the circuitry is configured to:
   accept selecting of an output method of the visual representation from printing and displaying; and
   output the visual representation in the output method selected.

9. The image forming system according to claim 1, further comprising:
   an image forming apparatus including the image forming device and the reading device; and
   an image formation control apparatus connected to the image forming apparatus and configured to control image formation in the image forming apparatus.

10. A non-transitory recording medium storing a plurality of program codes which, when executed by one or more processors, causes the processors to perform a density adjusting method, the method comprising:
   reading, with a reading device, an image formed by an image forming apparatus;
   calculating a density of each predetermined unit area of the read image;
   determining whether the read image includes a region satisfying a predetermined density condition based on the calculated density; and
   outputting an image of a first region not satisfying the predetermined density condition, an image of a second region satisfying the predetermined density condition, and a visual representation associated with the second region in response to a determination that the read image includes the second region.

11. A printed matter including:
   an image formed by an image forming apparatus; and
   a visual representation, separate from the image, indicating a region of the image wherein the image has a density difference greater than an allowable range for a given density level, the visual representation being discrimination of an uneven density region from another region of the image.

12. The printed matter according to claim 11, wherein the visual representation represents information on a density distribution of the image.

* * * * *